United States Patent
Kojima

(10) Patent No.: US 12,361,724 B2
(45) Date of Patent: Jul. 15, 2025

(54) IMAGE PROCESSING DEVICE, MOBILE OBJECT, IMAGE PROCESSING METHOD, AND STORAGE MEDIUM

(71) Applicant: CANON KABUSHIKI KAISHA, Tokyo (JP)

(72) Inventor: Yasuhiro Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 17/965,970

(22) Filed: Oct. 14, 2022

(65) Prior Publication Data
US 2023/0132456 A1    May 4, 2023

(30) Foreign Application Priority Data
Oct. 29, 2021   (JP) .................... 2021-177136

(51) Int. Cl.
| | |
|---|---|
| G06V 20/58 | (2022.01) |
| G06F 3/14 | (2006.01) |
| G06F 3/147 | (2006.01) |
| G06F 3/16 | (2006.01) |
| G06T 7/70 | (2017.01) |
| G06V 10/25 | (2022.01) |

(52) U.S. Cl.
CPC ............ *G06V 20/58* (2022.01); *G06F 3/14* (2013.01); *G06F 3/16* (2013.01); *G06T 7/70* (2017.01); *G06V 10/25* (2022.01); *G06T 2207/10028* (2013.01); *G06T 2207/30252* (2013.01); *G06V 2201/07* (2022.01)

(58) Field of Classification Search
CPC .... G06V 20/58; G06V 10/25; G06V 2201/07; G06F 3/14; G06F 3/16; G06F 3/147; G06T 7/70; G06T 2207/10028; G06T 2207/30252; G06T 2207/10016; G06T 2207/30256; G09G 2340/00; G09G 5/00; G09G 2380/10
See application file for complete search history.

(56) References Cited

U.S. PATENT DOCUMENTS

| | | | |
|---|---|---|---|
| 11,170,234 B2* | 11/2021 | Nakazawa | B60R 1/26 |
| 11,287,879 B2* | 3/2022 | Oniwa | H04N 7/18 |
| 11,368,616 B2* | 6/2022 | Okabe | H04N 7/181 |

(Continued)

FOREIGN PATENT DOCUMENTS

| | | | |
|---|---|---|---|
| JP | 2013-161440 A | | 8/2013 |
| JP | 2016049953 A | * | 4/2016 |

(Continued)

*Primary Examiner* — Stephen R Koziol
*Assistant Examiner* — Joshua Chen
(74) *Attorney, Agent, or Firm* — Venable LLP

(57) ABSTRACT

To implement an image processing device capable of improving rear visibility of a mobile object, the image processing device includes: an acquisition unit configured to acquire a video from an imaging device that generates images of a rear of a mobile object; a display control unit configured to cause a display unit to display a first range in the video acquired by the acquisition unit; and a detection unit configured to detect a predetermined target based on the video acquired by the acquisition unit. When the detection unit detects the predetermined target, the display control unit causes the display unit to display the video in a second range different from the first range.

15 Claims, 23 Drawing Sheets

(56) References Cited

U.S. PATENT DOCUMENTS

2009/0265061 A1* 10/2009 Watanabe .............. G08G 1/166
 701/36
2020/0070723 A1* 3/2020 Asai ....................... G06V 20/58

FOREIGN PATENT DOCUMENTS

| JP | 6311646 B2 * | 4/2018 | ............... B60R 1/00 |
| WO | WO-2006100884 A1 * | 9/2006 | ............... B60R 1/00 |

* cited by examiner

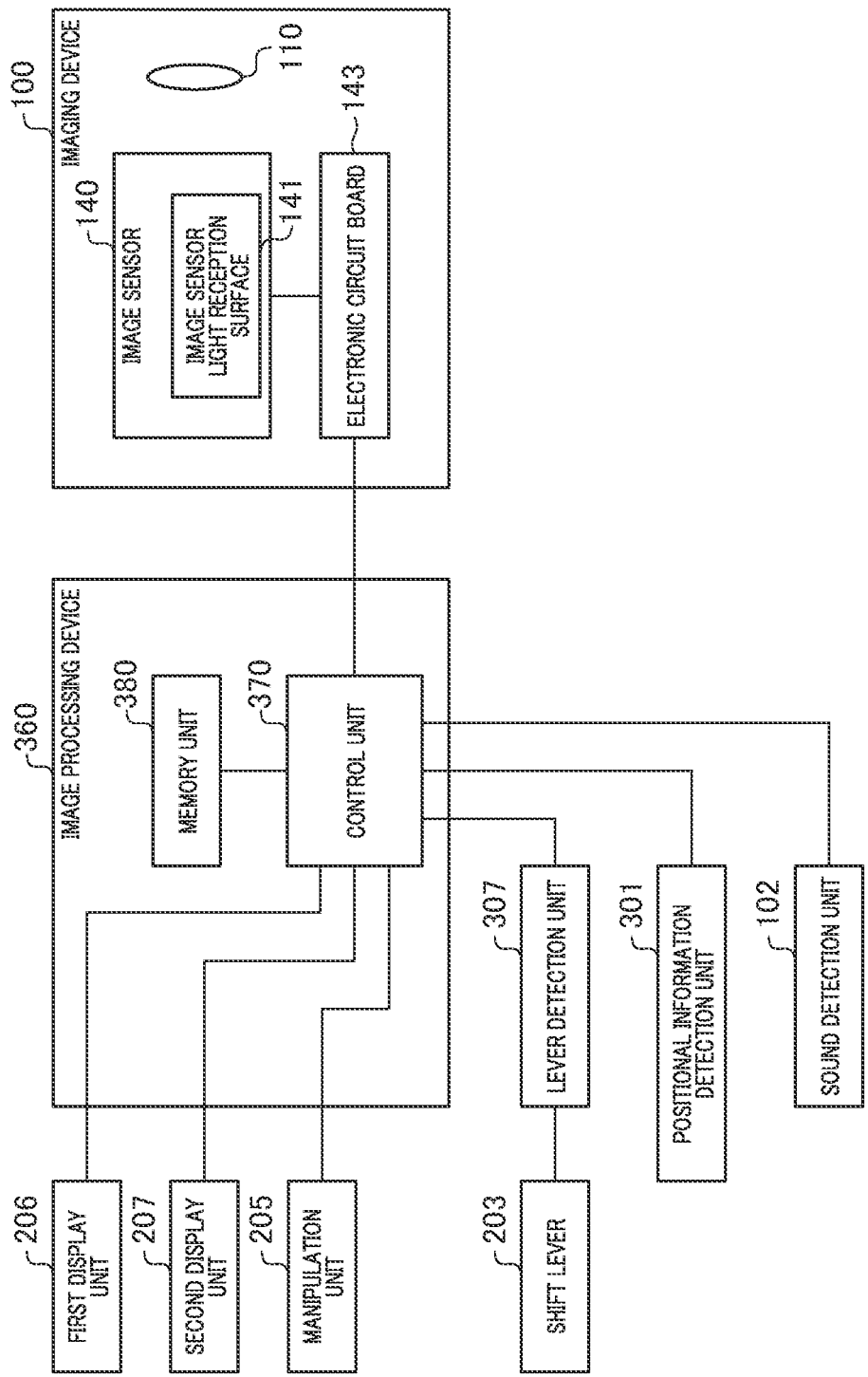

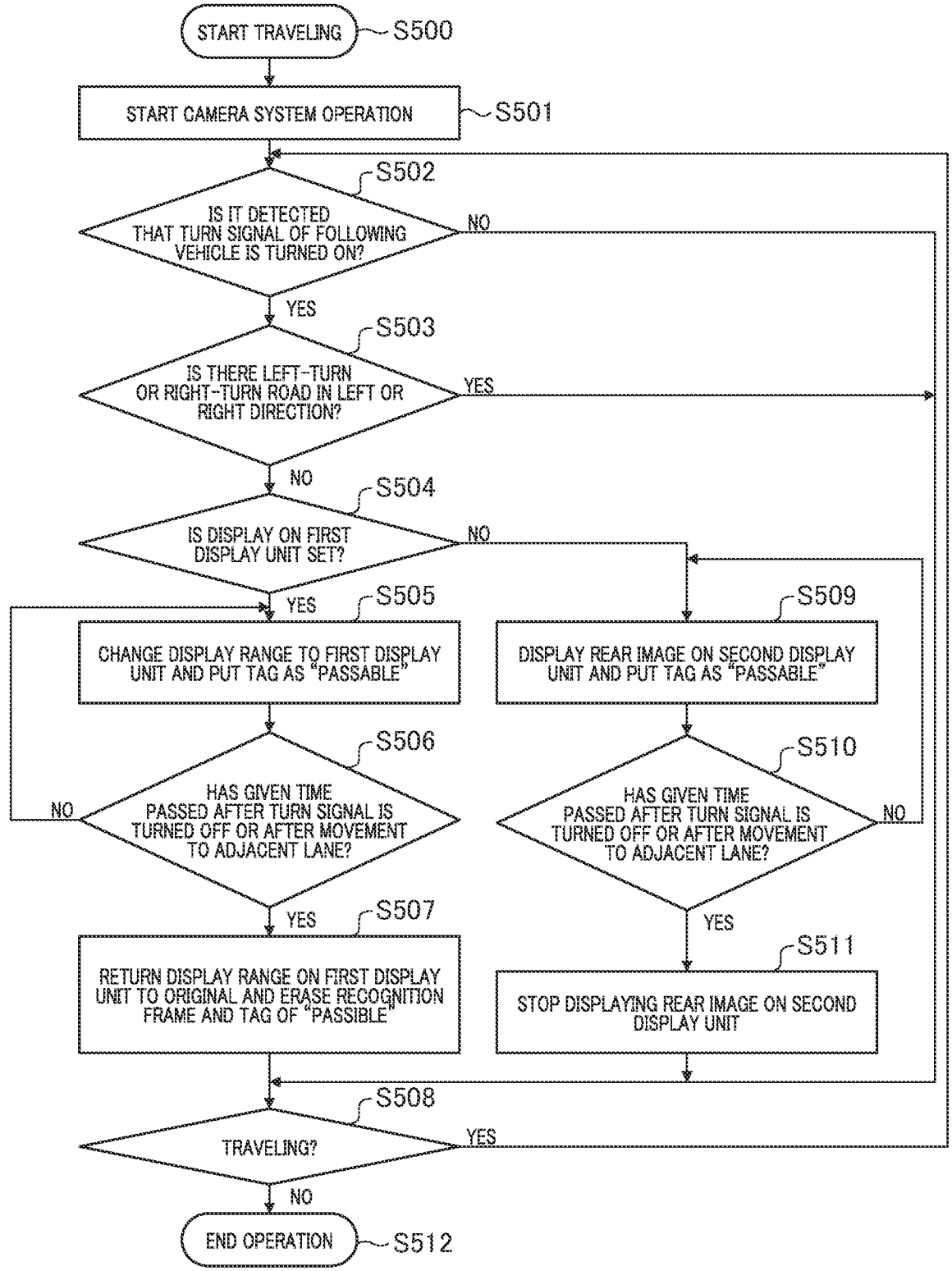

IMAGE PROCESSING DEVICE, MOBILE OBJECT, IMAGE PROCESSING METHOD, AND STORAGE MEDIUM

BACKGROUND OF THE INVENTION

Field of the Invention

The present invention relates to an image processing device for a mobile object, a mobile object, an image processing method, and a storage medium.

Description of the Related Art

In recent years, technologies capable of displaying images captured by in-vehicle cameras imaging to the rear on display panels installed in electronic rear-view mirrors or center clusters and confirming rear safety have become known.

Japanese Unexamined Patent Publication No. 2013-161440 discloses a configuration in which when an object around a vehicle is detected during display in a display mode in which an angle of field is narrow, the display mode is switched to a display mode in which the angle of field is wide, and when a departure manipulation of the vehicle is further detected, the display mode is switched again to the display mode in which the angle of field is narrow.

In Japanese Unexamined Patent Publication No. 2013-161440, however, to check the rear at the time of moving back is its objective, and thus switching of display at the time of normal driving is not taken into consideration since a departure manipulation is performed at a timing of the switching of the display.

However, there is a possibility of a following vehicle entering a blind spot. For example, a case of being overtaken from behind, a case of merging to a merging lane, a case of traveling of an emergency vehicle to the rear, a case of traveling of a dangerously driving vehicle which is a latest social problem, and the like are conceivable.

SUMMARY OF THE INVENTION

To solve the foregoing problems, an image processing device according to an aspect of the present invention includes at least one processor or circuit configured to function as: an acquisition unit configured to acquire a video from an imaging device that generates images of a rear of a mobile object; a display control unit configured to cause a display unit to display a first range in the video acquired by the acquisition unit; and a detection unit configured to detect a predetermined target based on the video acquired by the acquisition unit. When the detection unit detects the predetermined target, the display control unit causes the display unit to display the video in a second range different from the first range.

Further features of the present invention will become apparent from the following description of embodiments with reference to the attached drawings.

BRIEF DESCRIPTION OF THE DRAWINGS

FIG. 3 is a block diagram illustrating main units of the mobile object in which an image processing device is mounted according to the first embodiment.

FIG. 5 is a flowchart illustrating an example of a process of a camera system when a following vehicle passes according to the first embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Hereinafter, embodiments will be described in detail with reference to the drawings.

Figure 1:
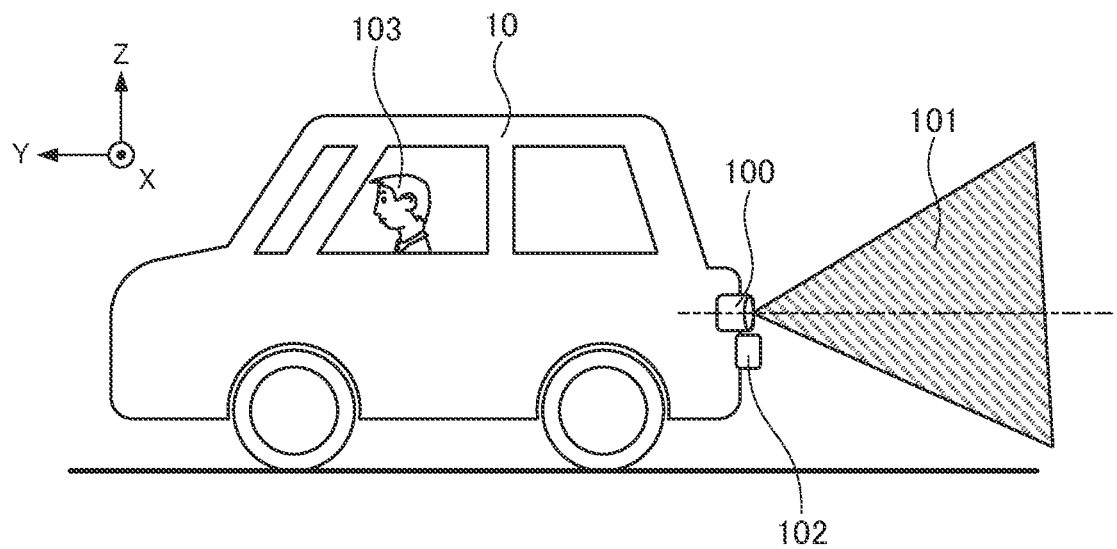
FIG. 1 is a diagram illustrating an example in which a mobile object and an imaging device are disposed according to a first embodiment of the present invention.
Figure 2:
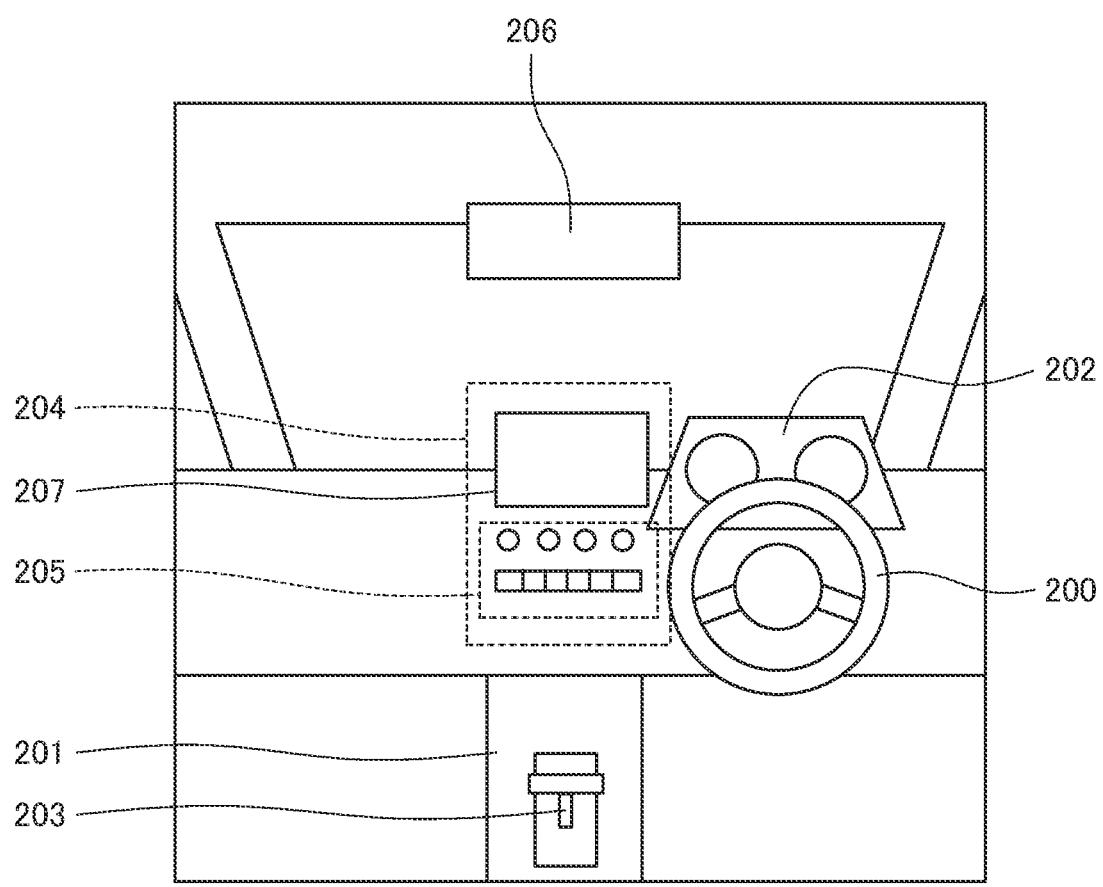
FIG. 2 is a diagram illustrating an in-vehicle display unit of the mobile object according to the first embodiment.

FIG. 1 is a diagram illustrating an example in which a mobile object and an imaging device are disposed according to a first embodiment. FIG. 2 is a diagram illustrating an in-vehicle display unit of the mobile object according to the first embodiment.

As illustrated in FIG. 1, an imaging device 100 that images to the rear and a sound detection unit 102 that acquires sound information from the rear are mounted in a mobile object 10. The mobile object 10 mentioned herein is, for example, a vehicle such as an automobile that runs on a public road and can move to any place when a driver 103 driving the mobile object 10 boards.

As illustrated in FIG. 1, forward from the mobile object 10 is defined as the +Y direction, an upper direction perpendicular to the ground is defined as a +Z direction, and the left from the driver 103, that is, a side in front of the paper surface, is defined as the +X direction.

FIG. 2 illustrates an in-vehicle state of the mobile object 10 when viewed from the driver 103. The driver 103 is assumed to sit, for example, on the right side in FIG. 2. The driver 103 manipulates a traveling direction of the mobile object 10 by manipulating a steering wheel (a steering unit) 200 provided in front and used to change the traveling direction of the mobile object 10.

An instrument panel 202 that displays a speed of the mobile object 10 or an engine speed is installed in front of the steering wheel 200. In the first embodiment, the instrument panel 202 is configured as a liquid crystal panel. A shift lever 203 for manipulating a transmission that changes a reduction ratio and a rotation direction is installed in a center console 201 to the left of the steering wheel 200. It is assumed that the shift lever 203 can be manipulated to change a setting in such a manner that a position is set to parking PK during parking, the position is set to drive DR during traveling, and the position is set to reverse RV during back traveling.

A center cluster 204 for displaying or a setting various kinds of information regarding the mobile object 10 is installed to the left of the instrument panel 202. A second display unit 207 capable of displaying an image acquired by the imaging device 100 and various kinds of information and changing a setting is installed in the center cluster 204. A present position at the time of traveling or a route guidance which is of a car navigation, an air conditioner setting, and the like can be displayed on the second display unit 207.

Further, various kinds of information such as display settings of a so-called advanced driving assistant system (ADAS) such as a system that tracks a preceding vehicle and automatically travels or a system that automatically supports parking can be displayed.

A manipulation unit 205 for changing various settings of the mobile object 10 is installed below the second display unit 207. The second display unit 207 is a touch panel type, and thus it is possible to change various settings of the mobile object 10 by using a touch panel function. Since the second display unit 207 also has a sound recognition function, a setting can also be changed by sound.

A first display unit 206 is installed above an upper windshield of the second display unit 207. The first display unit 206 is a device that functions as an electronic mirror device and checks and monitors the rear side during traveling by displaying an image acquired by the imaging device 100. When display of an electronic video of the first display unit 206 is turned off, the first display unit 206 is configured to be also usable as an optical mirror.

As will be described below, the first display unit 206 can be slid in the horizontal direction automatically in accordance with a display screen. The instrument panel 202 configured as a liquid crystal display unit or the like, a head-up display (not illustrated) installed near the center cluster 204, and the like may be integrated as the second display unit 207.

Next, the mobile object 10 will be described with reference to FIGS. 3 and 4.

FIG. 3 is a block diagram illustrating main units of the mobile object 10 according to the first embodiment. The mobile object 10 includes the imaging device 100 and an image processing device 360. As illustrated in FIG. 3, the imaging device 100 provided in the mobile object 10 includes an optical system 110 that forms an optical subject image of the rear of the mobile object 10. The subject image is formed on an image sensor light reception surface 141 which is a photoelectric conversion area of an image sensor 140 which is a photoelectric conversion element and is converted into an electrical signal.

The electrical signal converted by the image sensor 140 is converted into an image signal by an electronic circuit board 143. A function of the electronic circuit board 143 may be embedded in the image sensor. Here, the imaging device 100 functions as an acquisition unit that acquires a video from an imaging device that images to the rear of a mobile object.

The image signal generated as described above is transmitted to the image processing device 360. The image processing device 360 includes a control unit 370 that performs various kinds of image processing such as distortion correction and cutting, various kinds of signal control, control of selection of signal input and output destination, and the like.

A CPU serving as a computer is embedded in the control unit 370 and controls an operation of each unit of the entire device based on a computer program stored in a memory unit 380 serving as a storage medium. The control unit 370 may include a processor such as a GPU specialized for image processing.

The image processing device 360 includes a memory unit 380 that temporarily stores an image or stores a computer program.

Image processing is performed by an image processing hardware circuit (not illustrated) (for example, a circuit that includes a GPU) provided separately from the CPU in the control unit 370, but may be performed by software using the CPU or the like in the control unit 370.

An image signal transmitted to the image processing device 360 is subjected to various kinds of image processing such as distortion correction and cutting to be converted into a display signal in a display control circuit (not illustrated) provided in the control unit 370. The display signal is transmitted to the first display unit 206 or the second display unit 207 provided in the mobile object 10 to perform display so that the driver 103 can view an image. The first display unit 206 and the second display unit 207 are examples of a display unit.

A setting of a touch panel function mounted on the manipulation unit 205 or the second display unit 207 or various functions can be changed by a sound recognition unit (not illustrated). When the settings have been changed, a signal indicating the change in settings is transmitted to the image processing device 360. In this case, the image processing device 360 performs display indicating the change in the setting on the first display unit 206 or the second display unit 207.

A lever detection unit 307 that recognizes a present position of the shift lever 203 is provided in the shift lever 203. When the position of the shift lever 203 is changed, a position signal indicating the change in the position is transmitted to the image processing device 360. The position signal is used to determine various operations performed by the image processing device 360, as will be described below.

In the first embodiment, the sound detection unit 102 that detects a sound from the rear of the mobile object 10 is provided. Thus, sound information acquired by the sound detection unit 102 is transmitted to the image processing device 360 and is used to determine various operations performed by the image processing device 360, as will be described below.

The sound detection unit 102 is configured with a directional stereo microphone in the first embodiment and is assumed to be able to detect a direction or a position of a sound source located on the rear side.

In the mobile object 10, a positional information detection unit 301 that acquires information regarding a present position of the mobile object 10 is also installed. The positional information detection unit 301 according to the first embodiment is configured with a Global Navigation Satellite System (GNSS), a Global Positioning System (GPS), or the like that acquires positional information from positioning satellites and can acquire accurate positional information of the mobile object 10.

The positional information of the mobile object 10 acquired by the positional information detection unit 301 is transmitted to the image processing device 360 and is compared with map information stored in the memory unit 380 to be used to determine various operations performed by the image processing device 360, as will be described below.

Figure 4A:
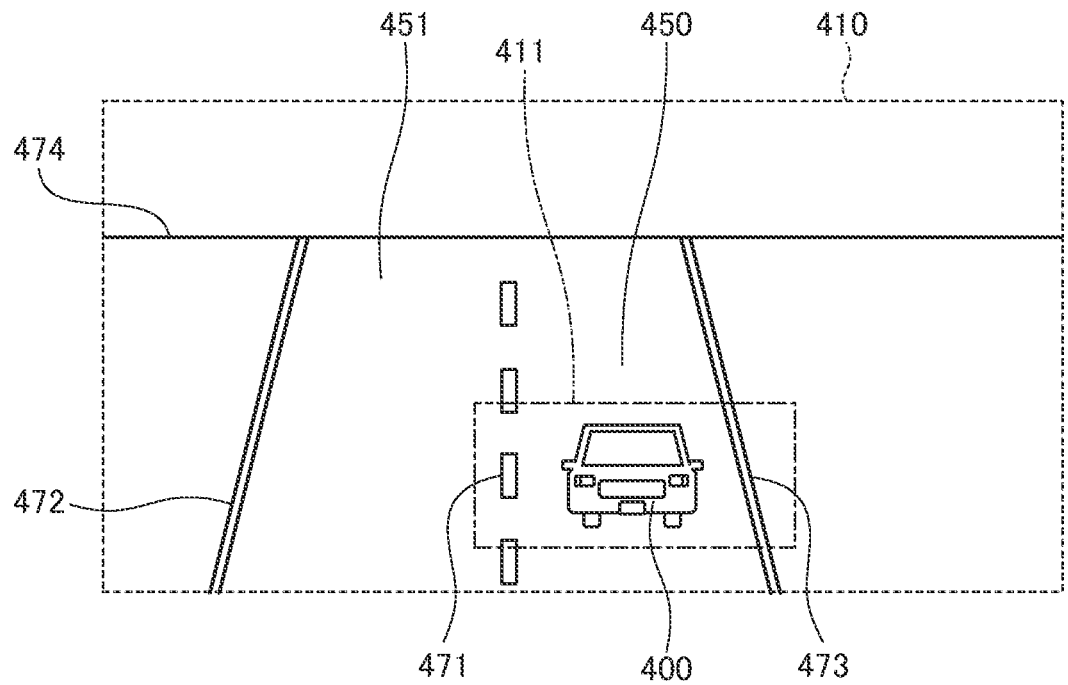
FIG. 4A is a diagram illustrating a normal display imaging region according to the first embodiment and FIG. 4B is a diagram illustrating a state in which a driver changes a setting to change a range of the display imaging region according to the first embodiment.
Figure 4B:
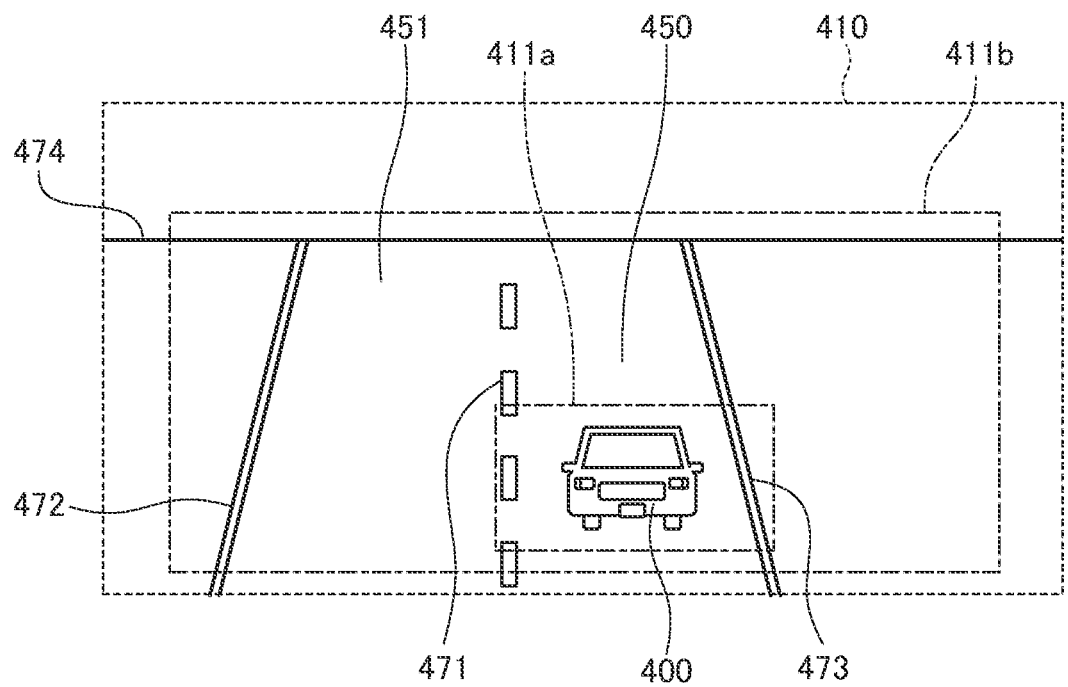

Next, a display imaging region will be described with reference to FIGS. 4A and 4B. FIG. 4A is a diagram illustrating a normal display imaging region according to the first embodiment and FIG. 4B is a diagram illustrating a state in which the driver 103 changes a setting to change a range of the display imaging region according to the first embodiment.

In the first embodiment, the entire region of the image sensor light reception surface 141 is used as an image detection imaging region 410 for image recognition and object detection. However, a part of the image sensor light reception surface 141 may be used as the image detection imaging region 410.

The image detection imaging region 410 illustrated in FIG. 4 indicates a range used for image recognition and object detection. A display imaging region 411 indicates a range displayed on the first display unit 206 or the second display unit 207. The display imaging region 411 is an example of a first range. A following vehicle 400 is a vehicle traveling in the rear of the mobile object 10. An own lane 450 is a lane in which the mobile object 10 is traveling. An adjacent lane 451 is a lane which is installed in parallel to the own lane 450 and is in the same traveling direction of that of the own lane 450. In the first embodiment, the own lane 450 will be described as a so-called traveling lane and the adjacent lane 451 will be described as a so-called passing lane.

A lane boundary line 471 is a line separating the own lane 450 from the adjacent lane 451. A central line 472 is a line separating the own lane 450 from a road in an opposite direction to the further right (the −X direction) of the adjacent lane 451. An outside line 473 is a line separating the own lane 450 from a pedestrian walkway other than traveling lanes. A horizon line 474 is a limit line which is far away from the rear (the −Y direction) of the own lane 450 and the adjacent lane 451 and can be imaged by the imaging device 100

The image processing device 360 in FIG. 3 cuts a range narrower than the image detection imaging region 410 (illustrated by a dotted line) as a display imaging region 411 (illustrated as a one-dot chain line), as illustrated in FIG. 4A. Then, a display image is generated to be displayed by the first display unit 206 or the second display unit 207 in accordance with a situation.

The display imaging region 411 is configured such that its size can be changed through a manipulation on a touch panel mounted on the second display unit 207 or the manipulation unit 205 by the driver (user) 103, a sound produced to a sound recognition unit (not illustrated), or the like. That is, the display imaging region 411 can be changed to any size (a display imaging region 411a or a display imaging region 411b, or the like in FIG. 4B) in the image detection imaging region 410.

The display imaging region 411 may be a range in which the own lane 450 falls with a margin so that the following vehicle 400 can be easily recognized, as illustrated in FIG. 4A. However, the display imaging region 411 may be a range in which the own lane 450 falls tightly, as indicated in the display imaging region (narrow angle) 411a in FIG. 4B, or may be a particularly right and left broad range in which the adjacent lane 451 also falls, as indicated by the display imaging region (wide angle) 411b.

Next, operations of the mobile object and the camera system described in FIGS. 1 to 3 according to the first embodiment will be described in detail with reference to FIGS. 5 to 8.

FIG. 5 is a flowchart illustrating an example of a process of a camera system when a following vehicle passes according to the first embodiment. An operation of each step in FIG. 5 is performed by causing a CPU serving as an internal computer of the control unit 370 to execute a computer program stored in the memory unit 380.

In FIG. 5, when the driver 103 sets the position of the shift lever 203 to the drive DR in step S500 and starts normal traveling of the mobile object 10, a process in the control unit 370 starts and a process of step S501 is performed.

In step S501, a program stored in the memory unit 380 is called by the control unit 370 to start the process.

When the process starts, the control unit 370 acquires an image captured by the imaging device 100 and displays a predetermined first range (a range of the region 411 in FIG. 4A) of the image on the first display unit 206. Here, step S501 functions as a display control unit (a display control step) that causes the first display unit to display a first range in a video acquired by the imaging device 100.

Subsequently, in step S502, the control unit 370 determines whether a direction indicator (hereinafter referred to as a turn signal) of the following vehicle 400 traveling in the same lane as the mobile object 10 described in FIGS. 6A and 6B blinks from a video of the image detection imaging region 410 imaged by the imaging device 100. When the turn signal blinks, a process of step S503 is subsequently performed. When the turn signal does not blink, a process of step S508 is performed. Here, step S502 functions as a detection unit (a detection step) that detects a predetermined target based on a video acquired by the imaging device 100.

In step S502, the control unit 370 detects that the following vehicle 400 which is a vehicle in the same lane as the mobile object 10 and of which the turn signal blinks as a predetermined target. That is, the control unit 370 detects the following vehicle 400 which is another moving object (vehicle) performing a predetermined movement including a predetermined movement including operations (a turn signal blinking operation) as the predetermined target based on the video acquired by the imaging device 100.

In the first embodiment, to facilitate description in step S502, it is determined whether the turn signal blinks. However, it may be determined which turn signal blinks between the right and left turn signals of the following vehicle 400 and a subsequent operation may be changed.

In step S503, the control unit 370 refers to map information stored in the memory unit 380, positional information detected by the positional information detection unit 301 installed in the mobile object 10, or information in which the map information and the positional information are combined. Then, from the foregoing information, the control unit 370 determines whether there is a road into which the following vehicle 40 can enter by the left or right turn corresponding to a turn signal lighting direction 600 of the following vehicle 400 recognized in step S502, that is, a left-turn or right-turn allowed road different from the traveling road.

Step S503 is a step in which the control unit 370 determines whether the following vehicle of which the signal turn blinks is detected as the predetermined target by observing whether the following vehicle performs a simple operation for a left or right turn or a passing operation. That is, in step S503, based on information regarding a present position of the mobile object 10, the control unit 370 determines whether another mobile object (the following object 400) performs a passing operation or a left or left turn and determines whether this mobile object is detected as the predetermined target.

When there is no left-turn or right-turn allowed road, a process of step S504 is performed. When there is the left-turn or right-turn allowed road, the process of step S508 is performed.

In step S504, the control unit 370 determines whether a display unit set in advance is the first display unit 206 or the second display unit 207. When the first display unit 206 is set in advance as the display unit, a process of step S505 is performed. When the second display unit 207 is set in advance as the display unit, a process of step S509 is performed.

That is, in the first embodiment, in the stage of step S501, when a video of the first range is displayed on the first display unit 206 and the predetermined target is detected, the display range is switched so that a video of the second range is displayed on one of the preset first display unit 206 or second display unit 207. In step S504, one of the first display unit 206 and the second display unit 207 is selected, but both the display units may be selected as the display units.

Step S505 is a step of changing a display range (or a display position) of the first display unit 206. In step S505, the control unit 370 changes the display range (or the display position) on the first display unit 206 from the display range indicated by the display imaging region 411 of FIG. 4A to a display range indicated by a display imaging region 411c or 411d in FIG. 6A or 6B. That is, the display range is changed from the display range (the first range) indicated by the display imaging region 411 to the display range (the second range) indicated by the display imaging region 411c or 411d. The display imaging region 411c is a range that includes the display imaging region 411.

Figure 6A:
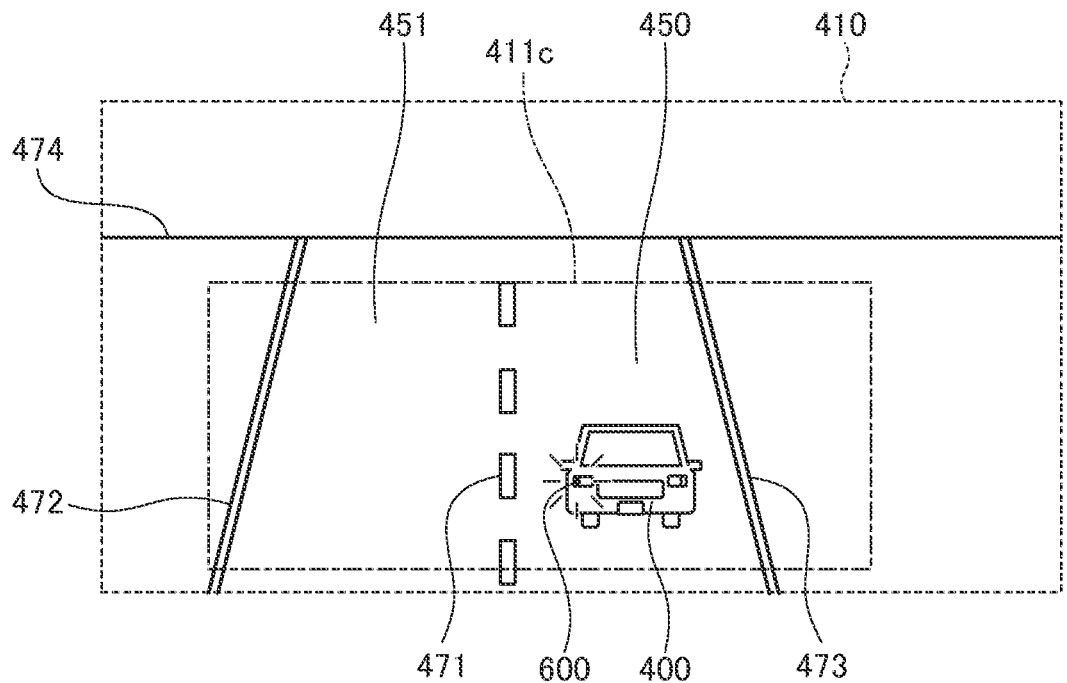
FIGS. 6A and 6B are diagrams illustrating a display imaging region when an imaging device images a following vehicle turning on and off a turn signal according to the first embodiment.
Figure 6B:
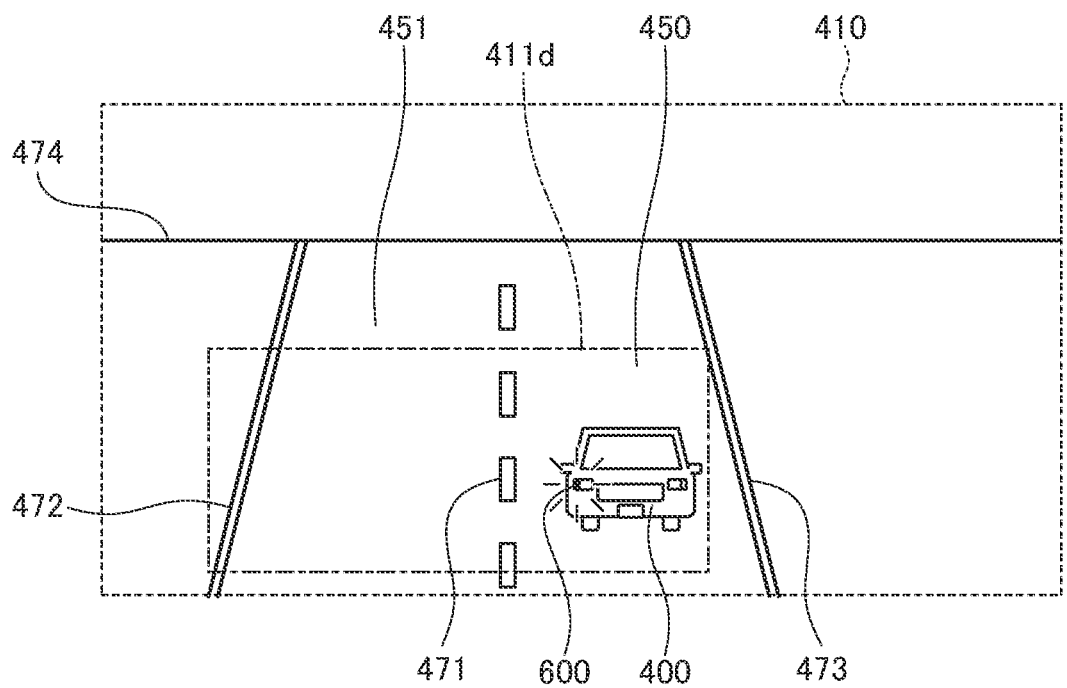

FIGS. 6A and 6B are diagrams illustrating a display imaging region when the imaging device 100 images the following vehicle 400 turning on and off the turn signal according to the first embodiment. FIG. 6A is a diagram illustrating a case in which the display imaging region 411 is expanded and displayed and FIG. 6B is a diagram illustrating a case in which an image center (a center of gravity) of the display imaging region 411 is moved. The turn signal lighting direction 600 indicates a turn signal of the side on which the turn signal blinks.

Alternatively, the display range may be changed from the display imaging region (wide angle) 411b illustrated in FIG. 4B to the display range (the second display range) indicated by the display imaging region 411c or 411d in FIG. 6A or 6B. That is, the display range is changed to a display region in which a display range is widened centering on the center of the original screen as in the display imaging region 411c of FIG. 6A or the center of the screen is moved so that the following vehicle 400 and the adjacent lane 451 are full in the screen as in the display imaging region 411d of FIG. 6B.

Here, step S505 functions as a display control unit (a display control step) of causing the first display unit to display a video of the second range different from the first range when the predetermined target is detected in step S502 functioning as the detection unit (the detection step). The second range is preferably wider than the first range and preferably overlaps the first range. Further, the second range may include the entire first range.

Figure 7:
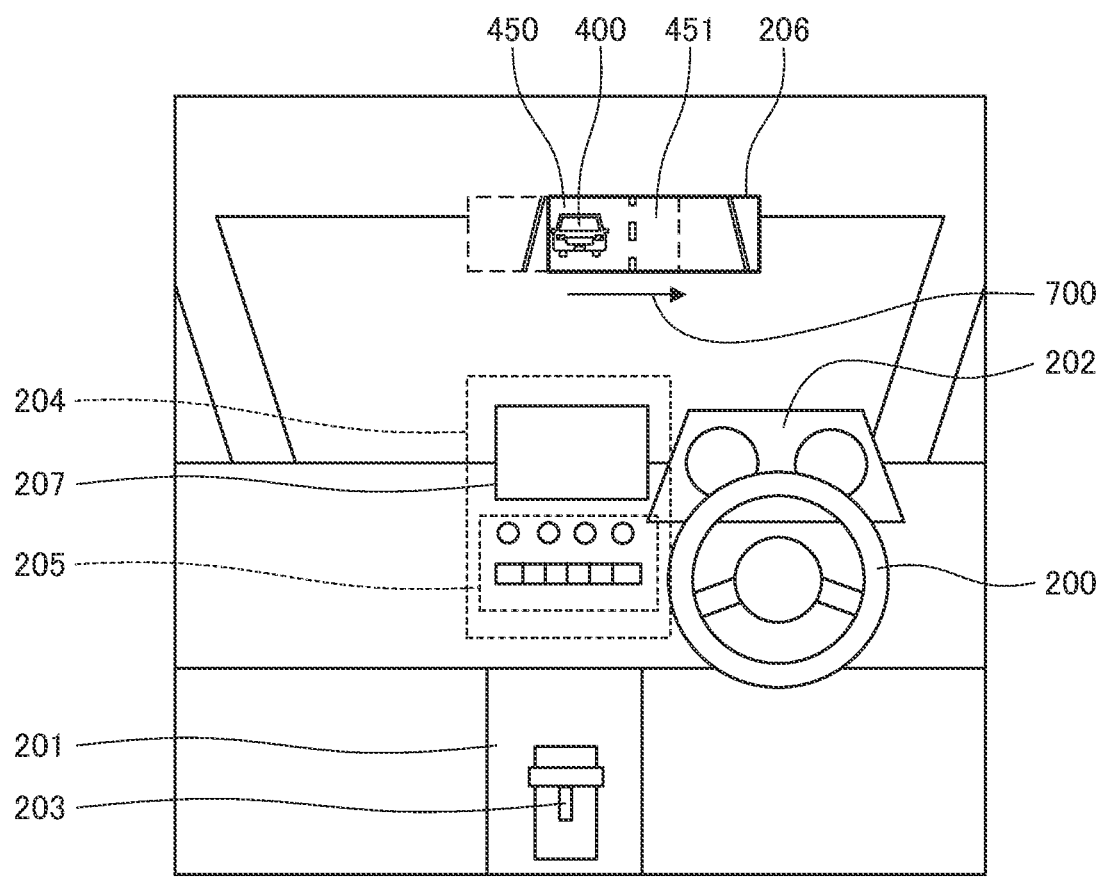
FIG. 7 is a diagram illustrating movement of a first display unit installed inside the mobile object according to the first embodiment.

Here, in the case of the change illustrated in FIG. 6B, the center of the screen may be moved to the left and the driver 103 may be likely to feel a discomfort. In this case, as illustrated in FIG. 7, by controlling movement of the first display unit 206 itself by a movement unit (not illustrated) in a direction indicated by an arrow 700 from a normal position of the first display unit 206, as indicated by a dotted line, it is possible to inhibit movement of the center of the screen when viewed from the driver 103. FIG. 7 is a diagram illustrating movement of the first display unit 206 installed inside the mobile object 10 according to the first embodiment. In FIG. 7, a display image of the first display unit 206 is converted into a mirror image.

Alternatively, a similar effect may be obtained by providing a black non-display region with a predetermined width to, for example, the left or right of the screen and shifting the non-display region. That is, the width of the first display unit 206 is set to be horizontally longer than a width illustrated in FIG. 7 and a black non-display region with a predetermined width is normally displayed to the left and right. When a display region of the first display unit 206 is shifted to the right, an effect similar to the effect obtained by shifting the first display unit 206 to the right may be obtained by setting, for example, the width of the right non-display region to zero and widening the width of the left non-display region.

In this way, in the first embodiment, when the following vehicle 400 of which the turn signal blinks is detected in step S502, the display range (the first range) in step S501 is expanded or contracted or the center of an image is moved to be changed to the second range. Here, the second range is a range in which at least the predetermined target is displayed and is preferably a range in which the mobile object 10 itself is displayed together.

The first embodiment is not limited thereto and the display range may be changed to a display range in which the expansion or the contraction of the display range and the movement of the center of the image are combined.

Figure 8:
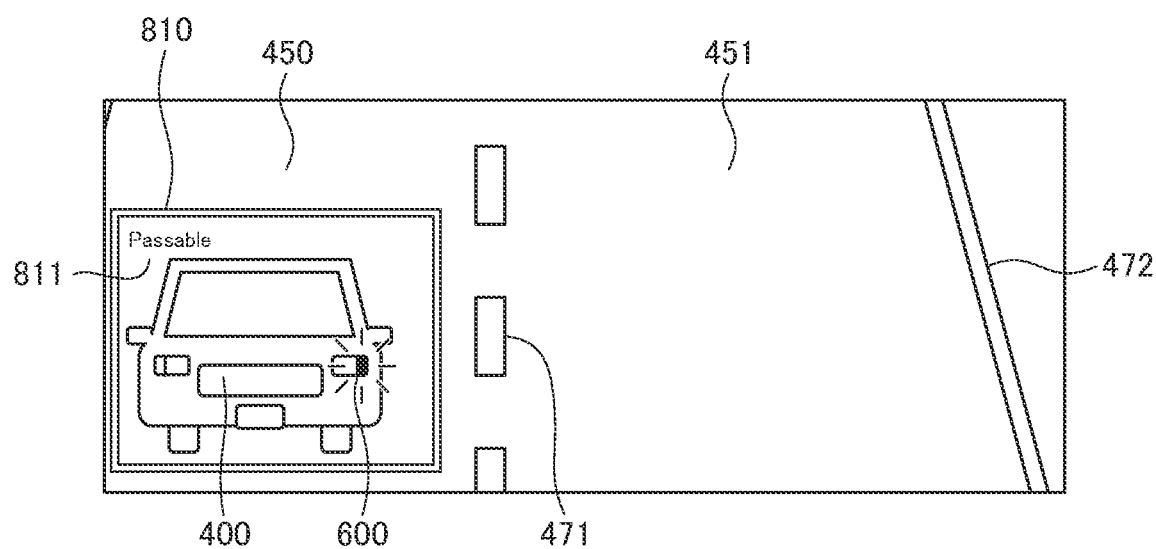
FIG. 8 is a diagram illustrating a display example of a mirror image on a first display unit in step S505 of FIG. 5.

Next, display content of the first display unit 206 in step S505 will be described with reference to FIG. 8. FIG. 8 is a diagram illustrating a display example of a mirror image on the first display unit 206 in step S505.

As illustrated in FIG. 8, in the first embodiment, the following vehicle 400 is surrounded by a recognition frame 810 as frame display so that the driver 103 pays attention to the following vehicle 400 displayed on the first display unit 206.

Then, a tag 811 such as "passable" regarding an attribute of the following vehicle 400 which is the predetermined target is incidentally displayed as a future operation prediction of the following vehicle 400 surrounded by the recognition frame 810. Accordingly, the driver 103 can pay attention. In addition to such attention, the driver 103 may pay attention by a sound or the like.

Subsequently, in step S506, the control unit 370 determines whether a given time has passed after the turn signal of the following vehicle 400 in the own lane 450 is turned off or the given time has passed after the following vehicle 400 of which the turn signal blinks is moved to the adjacent lane 451. The given time in the first embodiment is set to, for example, about 15 seconds. When one of these conditions is satisfied, it is determined that the following vehicle does not pass and a process of step S507 is performed. When one of these conditions is not satisfied, the process of step S505 is performed.

In step S507, the control unit 370 returns the display range on the first display unit 206 to the original display imaging region such as the display imaging region 411, the display imaging region (narrow angle) 411a, or the display imaging region (wide angle) 411b illustrated in FIG. 4 immediately before step S505. Then, the recognition frame 810 and the display of the tag 811 such as "passable" in FIG. 8 are erased and the process of step S508 is performed.

When the second display unit 207 is selected in step S504, the control unit 370 performs the process of step S509. At this time, the first display unit 206 is assumed not to change the display range or the display content.

Here, when the second display unit 207 displays a navigation system, the control unit 370 switches a present position or a route guidance displayed during traveling to video display.

That is, the display is switched to rear video display of a display range of the display imaging region 411c or 411d illustrated in FIG. 6 in the rear video from the imaging device 100. That is, step S509 here functions as a display control unit (a display control step) of causing the second display unit to display the video in the second range different from the first range when the predetermined target is detected in step S502 serving as the detection unit (the detection step).

The display range and content are similar to those described in step S505, and the rear video, the recognition frame 810, and the tag 811 such as "passible" are displayed as in FIG. 8. A display region of the second display unit 207 may be divided to display both a route guidance in the navigation system and a video from the imaging device 100 at the same time. Then, a process of step S510 is performed.

In step S510, the control unit 370 performs determination similar to that of step S506. That is, it is determined whether a given time has passed after the turn signal of the following vehicle 400 in the own lane 450 is turned off or the given time has passed after the following vehicle 400 of which the turn signal blinks is moved to the adjacent lane 451. In the first embodiment, the given time is set to, for example, about 15 seconds.

When one of these conditions is satisfied, it is determined that the following vehicle does not pass and a process of step S511 is performed. When one of these conditions is not satisfied, the process of step S509 is performed.

In step S511, the control unit 370 returns the display on the second display unit 207 to the display of the present position or the route guidance during traveling immediately before step S509. Thereafter, the process of step S508 is performed.

In step S508, the control unit 370 determines whether the mobile object 10 is traveling. In the first embodiment, it is determined whether the position of the shift lever 203 is set in the drive DR. When the mobile object is traveling, the process returns to step S502 to repeat the operation of steps S502 to S511.

When the lever detection unit 307 detects that the shift lever 203 is set at a position other than the drive DR, it is determined that the mobile object is not traveling, a process of step S512 is performed, and the operation of the camera system ends.

As described above, in the first embodiment, when it is detected that another mobile object performs a passing operation as a predetermined movement including operations, this mobile object is detected as a predetermined target and a display range is switched so that this mobile object is displayed.

Second Embodiment

A second embodiment which is a display example in an image processing device when an adjacent lane is a merging lane will be described with reference to FIGS. 9 and 10.

Figure 9:
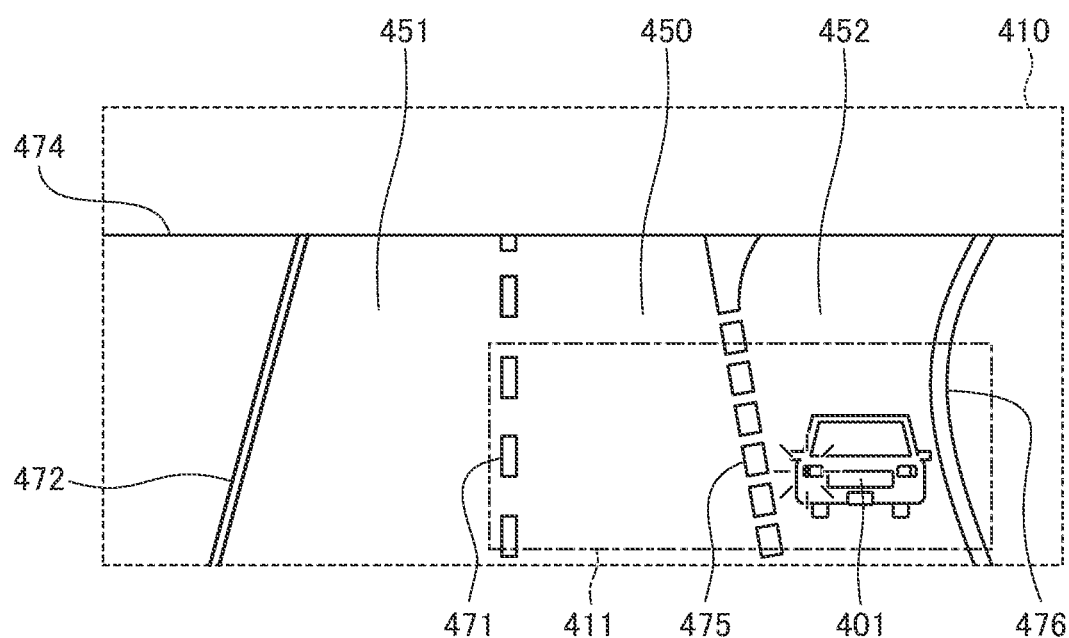
FIG. 9 is a diagram illustrating a display imaging region when the imaging device images a merging vehicle according to a second embodiment.

FIG. 9 is a diagram illustrating a display imaging region when the imaging device 100 images a merging vehicle according to a second embodiment.

Figure 10:
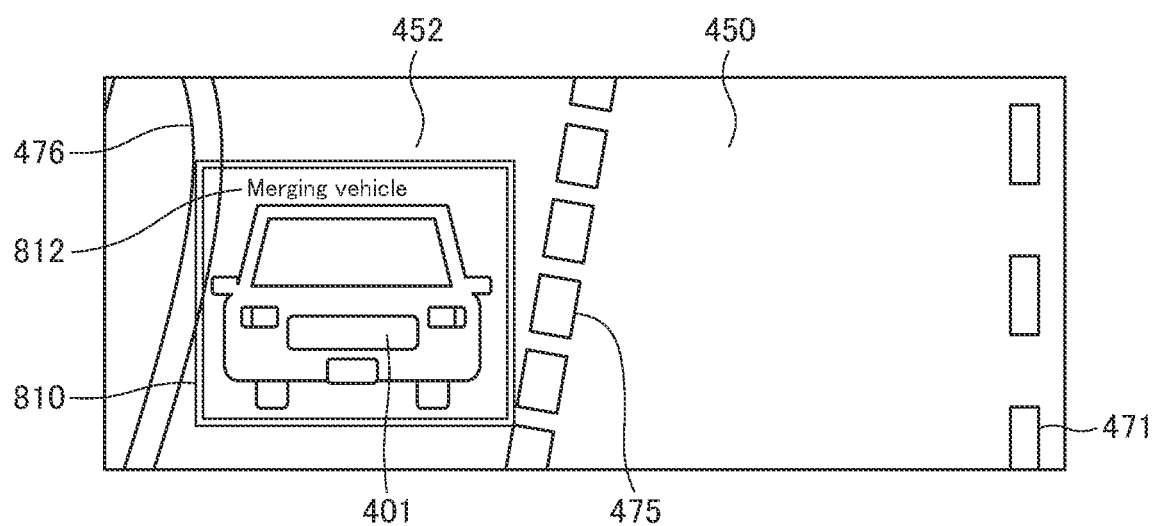
FIG. 10 is a diagram illustrating a display example of a mirror image in a first display unit or a second display unit when the merging vehicle is imaged according to the second embodiment.

FIG. 10 is a diagram illustrating a display example of a mirror image in a first display unit 206 or a second display unit 207 when the merging vehicle 401 is imaged according to the second embodiment.

In FIG. 9, a merging lane 452 is a lane which is adjacent to the own lane 450 from a halfway portion and merges afterwards to the own lane 450 and a merging vehicle 401 is a vehicle which is traveling in the merging lane 452 and subsequently merges to the own lane 450. Reference numeral 475 denotes a boundary between the merging lane 452 and the own lane 450. Reference numeral 476 denotes an outside line of the merging lane 452.

FIG. 9 illustrates a situation in which the merging vehicle 401 which is a vehicle performing merging is traveling in the merging lane 452 while the turn signal blinks.

At this time, a cut position is changed so that the merging vehicle 401 and the own lane 450 are displayed in the display imaging region 411.

Next, display on the first display unit 206 or the second display unit 207 will be described with reference to FIG. 10. FIG. 10 illustrates display of a mirror image for FIG. 9. FIG. 10 illustrates a display state of the mirror image when the situation of FIG. 9 is displayed on the first display unit 206 or the second display unit 207. The merging vehicle 401 is surrounded by the recognition frame 810 as in FIG. 8 and a tag 812 regarding an attribute of the merging vehicle 401 which is the predetermined target, such as a "merging vehicle." indicating a traveling situation of the merging vehicle 401 is incidentally displayed inside the recognition frame 810.

Accordingly, the driver 103 can pay attention. In this way, in the second embodiment, when it is detected that another mobile object performs a merging movement as a predetermined movement including operations, the predetermined target is detected and a display range is switched so that the other mobile object is displayed.

Third Embodiment

A third embodiment in a case in which an emergency vehicle such as a police car or an ambulance turns on a warning light and approaches the mobile object 10 and a camera system will be described with reference to FIGS. 11 to 15.

Figure 11:
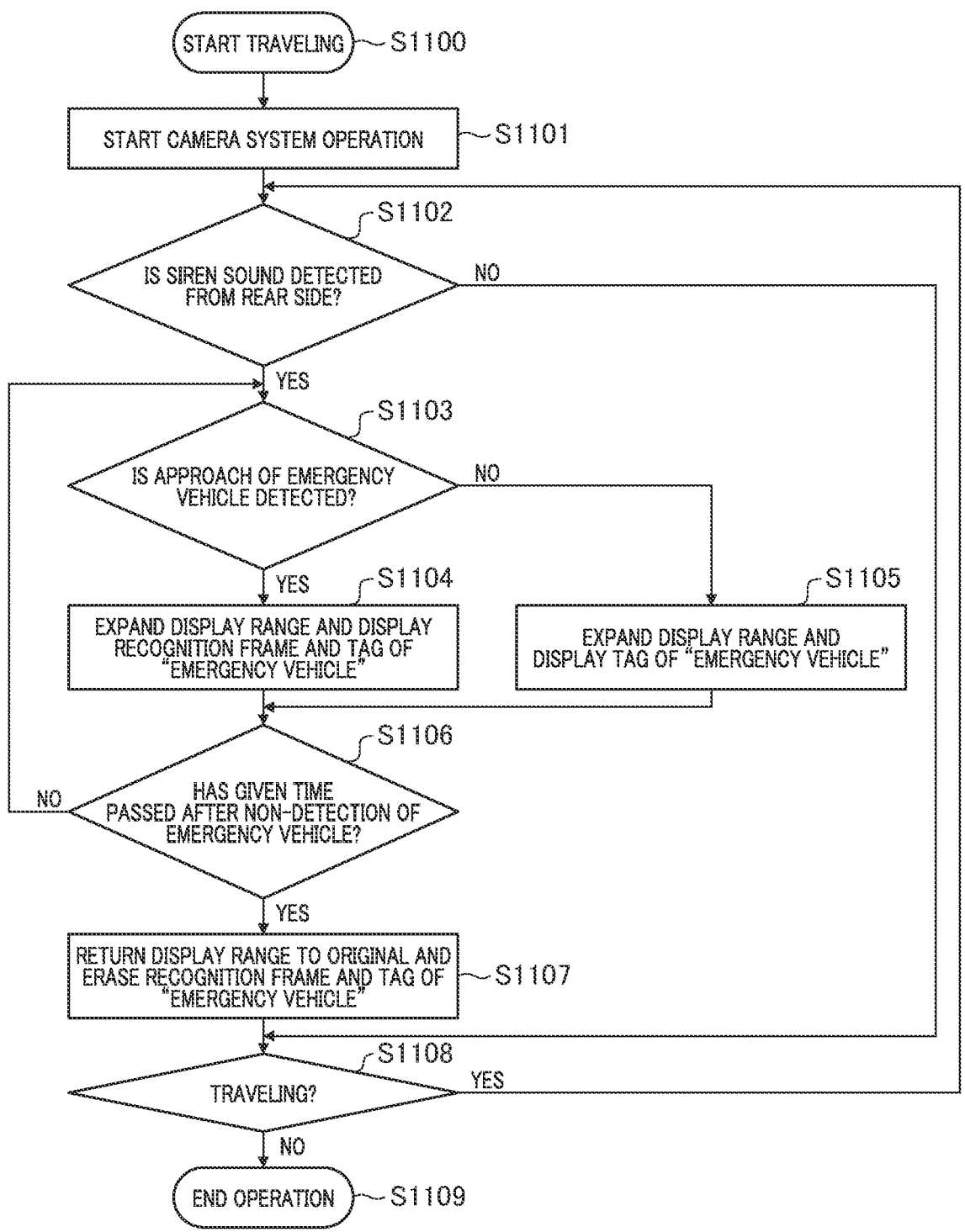
FIG. 11 is a flowchart illustrating a first example of a process of a camera system when an emergency vehicle approaches according to a third embodiment.

FIG. 11 is a flowchart illustrating a first example of a process of a camera system when an emergency vehicle approaches according to the third embodiment. An operation of each step in FIG. 11 is performed by causing a CPU serving as an internal computer of the control unit 370 to execute a computer program stored in the memory unit 380.

In the process illustrated in FIG. 11, when the driver 103 sets the position of the shift lever 203 to the drive DR in step S1100 and starts normal traveling of the mobile object 10, a flow starts and a process of step S1101 is performed.

In step S1101, a program stored in the memory unit 380 is called by the control unit 370 to start the process. As the process starts, the control unit 370 displays an image captured by the imaging device 100 on the first display unit 206 or the second display unit 207 and the process of step S1102 is performed.

Figure 12:
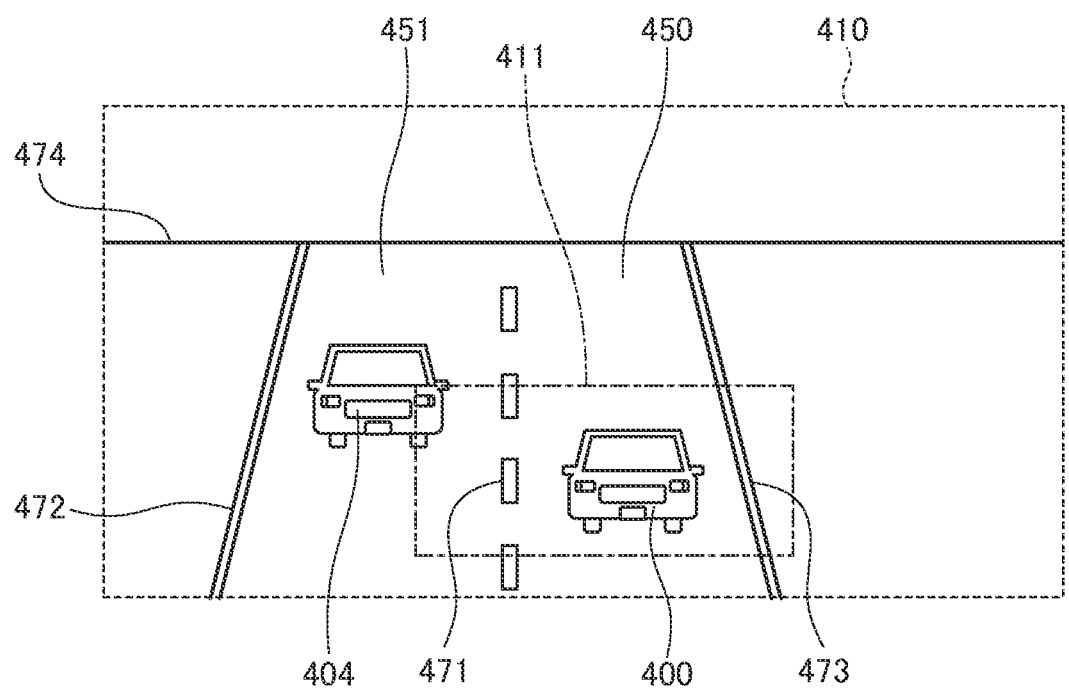
FIG. 12 is a diagram illustrating a display imaging region when a sound detection unit detects an emergency vehicle according to the third embodiment.

FIG. 12 is a diagram illustrating a display imaging region when the sound detection unit 102 detects an emergency vehicle according to the third embodiment.

FIG. 12 illustrates a situation in which, in the rear of the mobile object 10, the following vehicle 400 is traveling and a following vehicle 404 which is another following vehicle is traveling in an adjacent lane. In this situation, even when an emergency vehicle is traveling in the rear of the following vehicle 404 and approaches, the emergency vehicle cannot be confirmed in the image detection imaging region 410 in some cases.

However, in step S1102 of the third embodiment, when a siren of the emergency vehicle sounds, the sound detection unit 102 detects a direction in which the siren sounds. When the control unit 370 determines that the siren sounds from the rear side, a process of step S1103 is performed. When it is detected from a direction other than the rear side that the siren sounds or it is not detected that any siren sounds, a process of step S1108 is performed.

In step S1103, the control unit 370 determines whether the imaging device 100 detects whether the emergency vehicle approaches. When it is detected that the emergency vehicle approaches, a process of step S1104 is performed. When it is not detected that the emergency vehicle approaches, a process of step S1105 is performed.

That is, based on a predetermined sound (a siren or the like) detected by the sound detection unit in step S1102 and a video acquired by the imaging device 100 in step S1103, another mobile object (emergency vehicle) producing the predetermined sound is detected as the predetermined target.

When it is determined in step S1103 that the approach of the emergency vehicle is not detected, the control unit 370 performs tag display indicating that the emergency approaches from the rear in step S1105.

Figure 13:
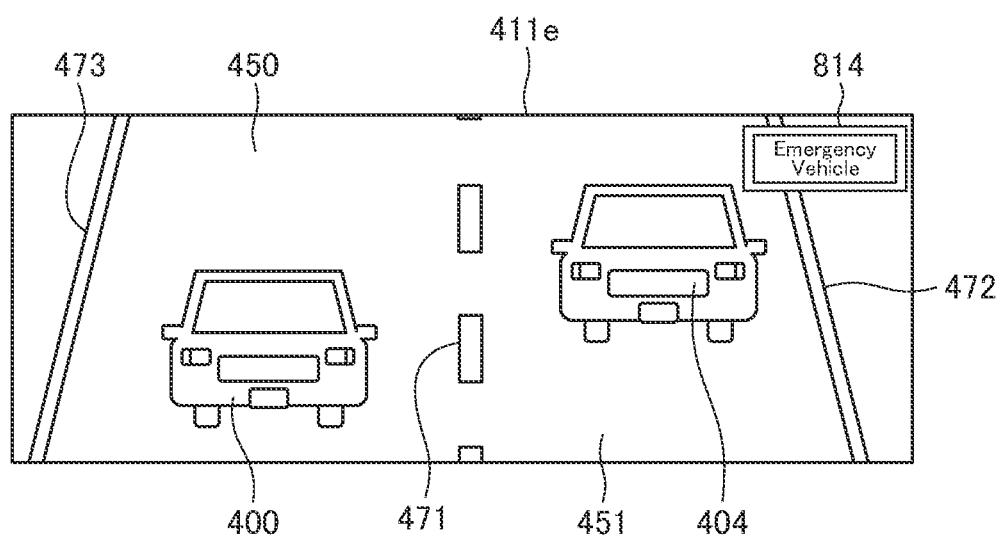
FIG. 13 is a diagram illustrating a display example on the first display unit or the second display unit when the sound detection unit detects an emergency vehicle according to the third embodiment.

FIG. 13 is a diagram illustrating a display example on the first display unit 206 or the second display unit 207 when the sound detection unit 102 detects an emergency vehicle according to the third embodiment.

An "emergency vehicle" tag 814 is tag display indicating that an emergency vehicle which can be detected by the imaging device 100 approaches. In FIG. 13, a mirror image is displayed. As illustrated in FIG. 13, the display imaging region 411 in FIG. 12 is expanded like a display imaging region 411e in FIG. 13 so that the adjacent lane 451 falls.

The tag 814 regarding an attribute of the emergency vehicle 403 such as an "emergency vehicle" is incidentally displayed as the predetermined target above a side on which there is the emergency vehicle 403 on the first display unit 206 or the second display unit 207. Accordingly, the driver 103 can pay attention. In addition to such attention, the driver 103 may pay attention by a sound or the like. Thereafter, a process of step S1106 is performed.

When the approach of the emergency vehicle is detected in step S1103, the process of step S1104 is performed. The control unit 370 expands the display imaging region to the display imaging region 411e to be displayed on the first display unit 206 or the second display unit 207 so that the emergency vehicle and the own lane 450 which is a traveling lane of the mobile object 10 are displayed.

Figure 14:
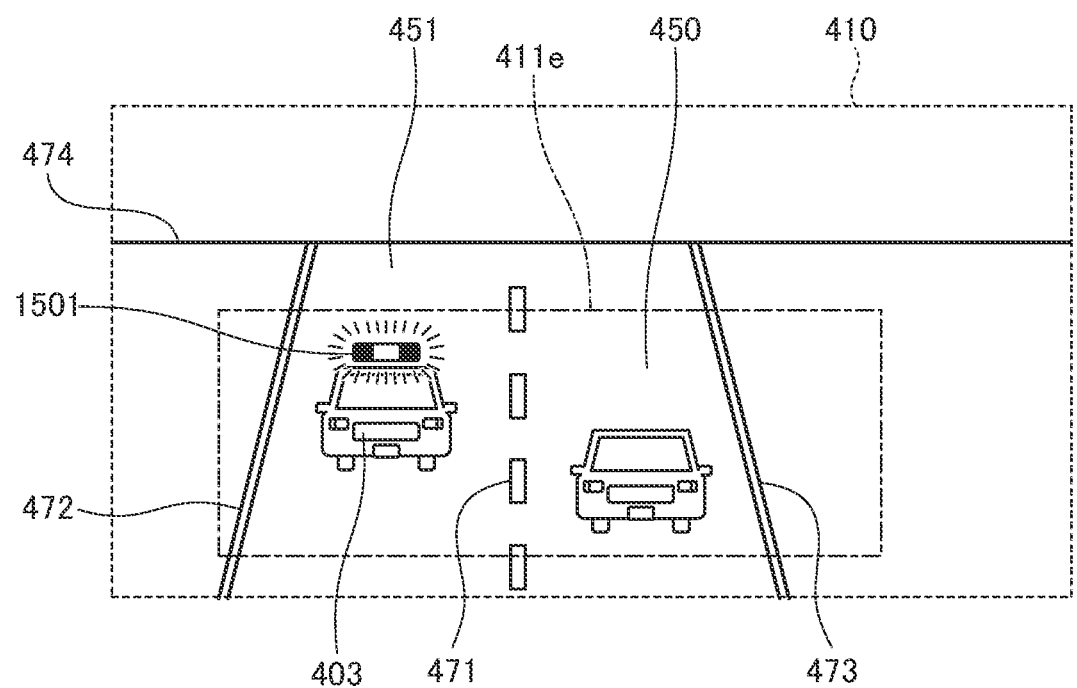
FIG. 14 is a diagram illustrating an example of a display imaging region when an emergency vehicle is detected in step S1103 of FIG. 11.
Figure 15:
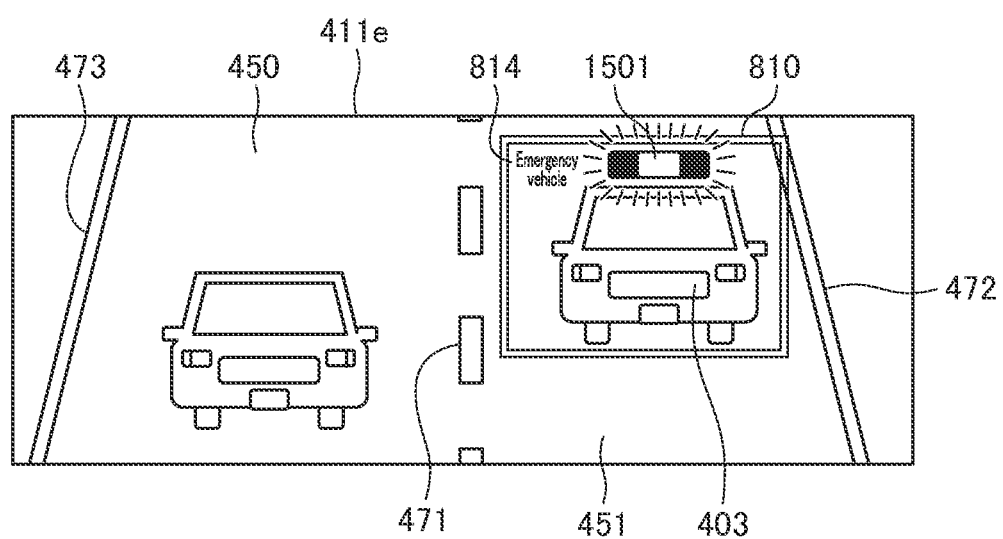
FIG. 15 is a diagram illustrating a display example of the first display unit or the second display unit when an emergency vehicle is detected in step S1103 of FIG. 11.

FIG. 14 is a diagram illustrating an example of a display imaging region when the emergency vehicle is detected in step S1103 of FIG. 11. FIG. 15 is a diagram illustrating a display example of the first display unit 206 or the second display unit 207 when the emergency vehicle is detected in step S1103 of FIG. 11.

As illustrated in FIG. 15, the tag 814 of the "emergency vehicle" and the recognition frame 810 are displayed in the emergency vehicle 403. In FIGS. 14 and 15, the emergency vehicle 403 produces a siren sound and turns on a warning light 1501. In addition to such display, the driver 103 may pay attention by a sound or the like. Thereafter, a process of step S1106 is performed.

In step S1106, the control unit 370 determines whether a given time has passed after the imaging device 100 does not detect the emergency vehicle 403 of which the warning light 1501 is turned on or the sound detection unit 102 does not detect the siren sound. In the third embodiment, the given time is set to, for example, about 20 seconds.

In the case of Yes in step S1106, a process of step S1107 is performed. In the case of No, the process returns to step S1103 to repeat the operations of steps S1103 to S1106.

In step S1107, the control unit 370 returns the display range on the first display unit 206 to the original display range of the first display unit 206 or the second display unit 207 immediately before step S1103, erases the tag of the "emergency vehicle" or the recognition frame, performs the process of step S1108.

In step S1108, the control unit 370 determines whether the mobile object 10 is traveling. In the third embodiment, it is determined whether the position of the shift lever is set at the drive DR. When the position of the shift lever is set at the drive DR, that is, the mobile object is traveling, the process returns to step S1102.

When the lever detection unit 307 detects in step S1108 that the shift lever 203 is set at a position other than the drive DR, it is determined that the mobile object is not traveling and the operation of the camera system ends in step S1109.

As described above, in the third embodiment, when it is detected that another mobile object performs a traveling operation of turning on a warning light as a predetermined movement including operations, the mobile object is detected as a predetermined target and a display range is switched.

Fourth Embodiment

In recent years, a dangerously driving action which is likely to harm another automobile has become a problem. In a fourth embodiment, a vehicle performing subsequent dangerous driving is detected, the driver 103 is informed of the vehicle and can easily view the dangerously driving vehicle to easily avoid an accident. A process in a case in which a dangerously driving vehicle is detected will be described in detail below with reference to the drawings.

An operation in a case in which a vehicle performing passing, meandering, or klaxon sounding called road rage driving in dangerous driving is detected will be described with reference to FIGS. 16 to 20.

Figure 16:
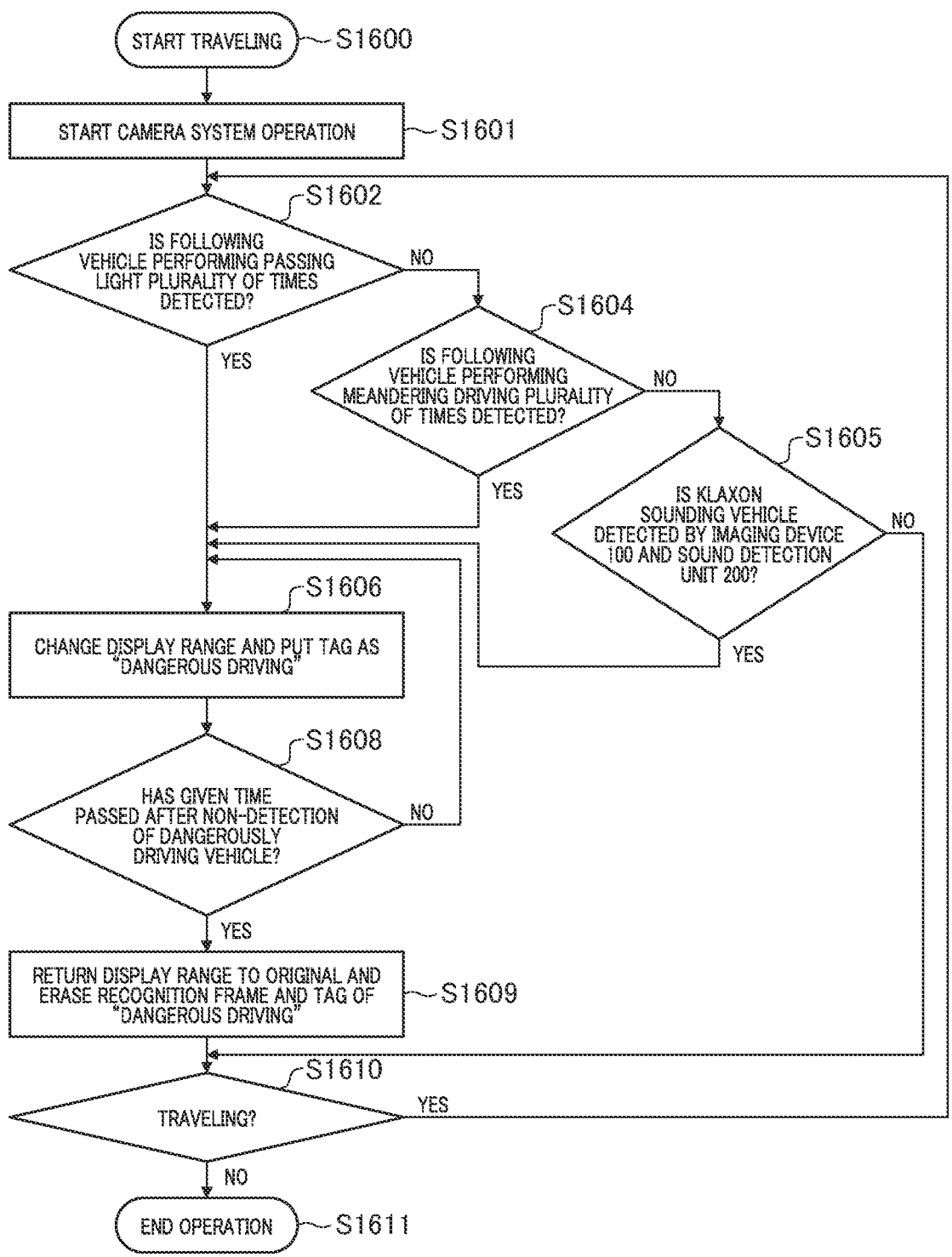
FIG. 16 is a flowchart illustrating a first example of a process of a camera system when a vehicle performing passing, meandering, or klaxon sounding is detected according to a fourth embodiment.

FIG. 16 is a flowchart illustrating a first example of a process of a camera system when a vehicle performing passing, meandering, or klaxon sounding is detected according to a fourth embodiment. An operation of each step in FIG. 16 is performed by causing a CPU serving as an internal computer of the control unit 370 to execute a computer program stored in the memory unit 380.

The meandering driving is not limited to road rage driving. For example, in a case in which a driver performs drunken driving, is dozing off, or is unconscious, a risk is high. Therefore, it is preferable to detect the case and pay attention quickly.

In a process illustrated in FIG. 16, the driver 103 sets a position of the shift lever 203 to the drive DR in step S1600. Then, when normal traveling of the mobile object 10 starts, the process starts and a process of step S1601 is performed.

In step S1601, a program stored in the memory unit 380 is called by the control unit 370 to start the process. As the process starts, the control unit 370 displays an image captured by the imaging device 100 on the first display unit 206 and the process of step S1602 is performed.

In step S1602, based on a signal from the imaging device 100, the control unit 370 determines whether a following vehicle performing a passing light operation a plurality of times within a given time is detected. Here, performing the passing light operation is assumed to be an operation of quickly turning on and off a headlight 602 in a high beam state. The passing performed once or twice is not dangerous driving in some cases. Therefore, in the fourth embodiment, it is determined whether the passing is performed a plurality of times within a given time. For example, it is determined whether the passing is performed three or more times for 20 seconds.

Figure 17:
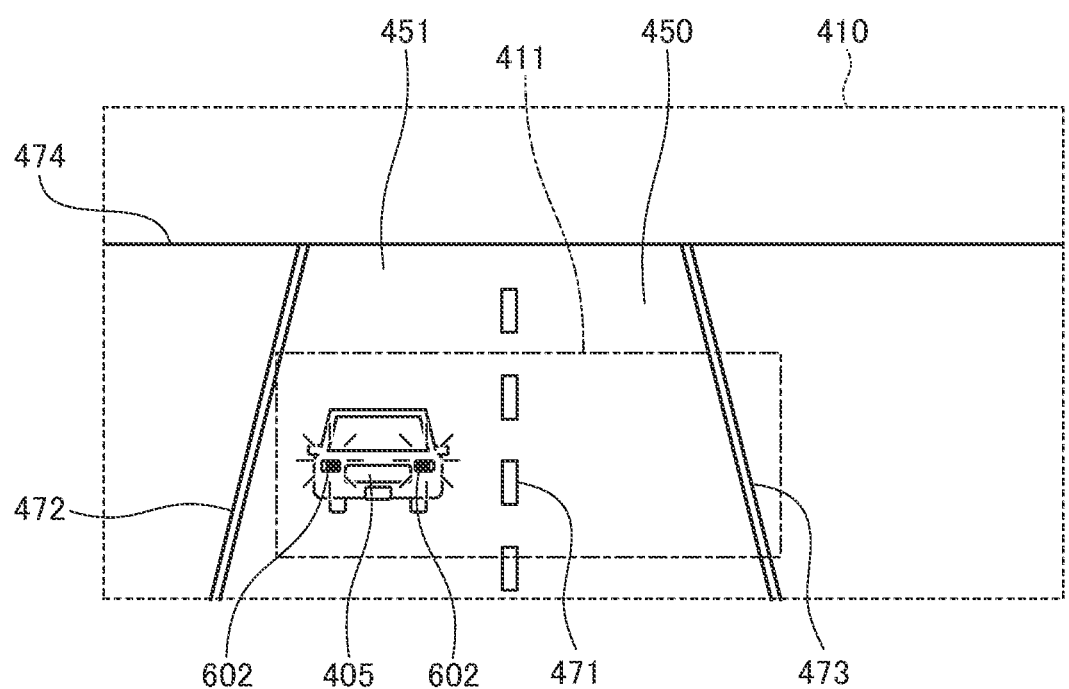
FIG. 17 is a diagram illustrating an example in which a vehicle performing passing is imaged by the imaging device.

FIG. 17 is a diagram illustrating an example in which a vehicle performing the passing light operation is imaged by the imaging device 100. At this time, the mobile object 10 is assumed to travel in the lane 451 which is a passing lane.

In the case of Yes in step S1602, a process of step S1606 is performed. In the case of No, a process of step S1604 is performed.

Step S1604 is a step of detecting a vehicle performing meandering driving even during dangerous driving. Specifically, in step S1604, based on a signal from the imaging device 100, the control unit 370 determines whether a following vehicle performing meandering driving is detected a plurality of times within a given time.

In the fourth embodiment, for example, when one of the tires of the front wheels of the following vehicle crosses a lane boundary line 471, an outside line 473, or the like and the other tire of the front wheels crosses the lane boundary line 471, the outside line 473, or the like, meandering driving is counted to be performed once.

Figure 18:
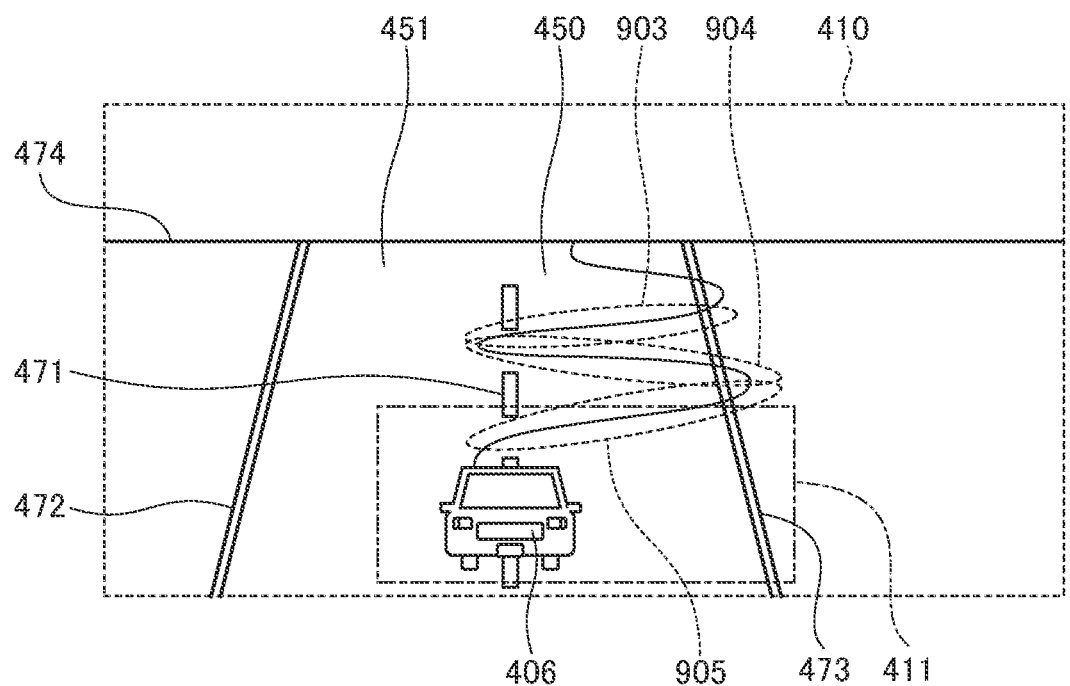
FIG. 18 is a diagram illustrating an example in which a vehicle performing meandering is imaged by the imaging device.

FIG. 18 is a diagram illustrating an example in which a vehicle performing meandering is imaged by the imaging device 100. FIG. 18 illustrates a state in which a meandering driving vehicle 406 performs meandering driving 903 once, performs meandering driving 904 twice, and performs meandering driving 905 three times. Since meandering performed up to twice is considered as an operation of avoiding a falling object. Therefore, in the fourth embodiment, a vehicle performing meandering three or more times, for example, within 20 seconds is determined to be the meandering driving vehicle 406.

In the case of Yes in step S1604, a process of step S1606 is performed. In the case of No, a process of step S1605 is performed.

Step S1605 is a step of detecting a vehicle producing a klaxon sound a plurality of times in the dangerous driving.

That is, in step S1605, the control unit 370 detects a vehicle producing a klaxon sound three or more times within a given time by combining a following vehicle detected based on an image from the imaging device 100 and the position of a sound source with directivity acquired from the sound detection unit 102. A klaxon sound produced once or twice is highly likely to be a klaxon sound for advertising an attention. Therefore, in the fourth embodiment, a vehicle producing a klaxon sound three or more times within, for example 20 seconds is determined as a klaxon sounding vehicle 407.

Figure 19:
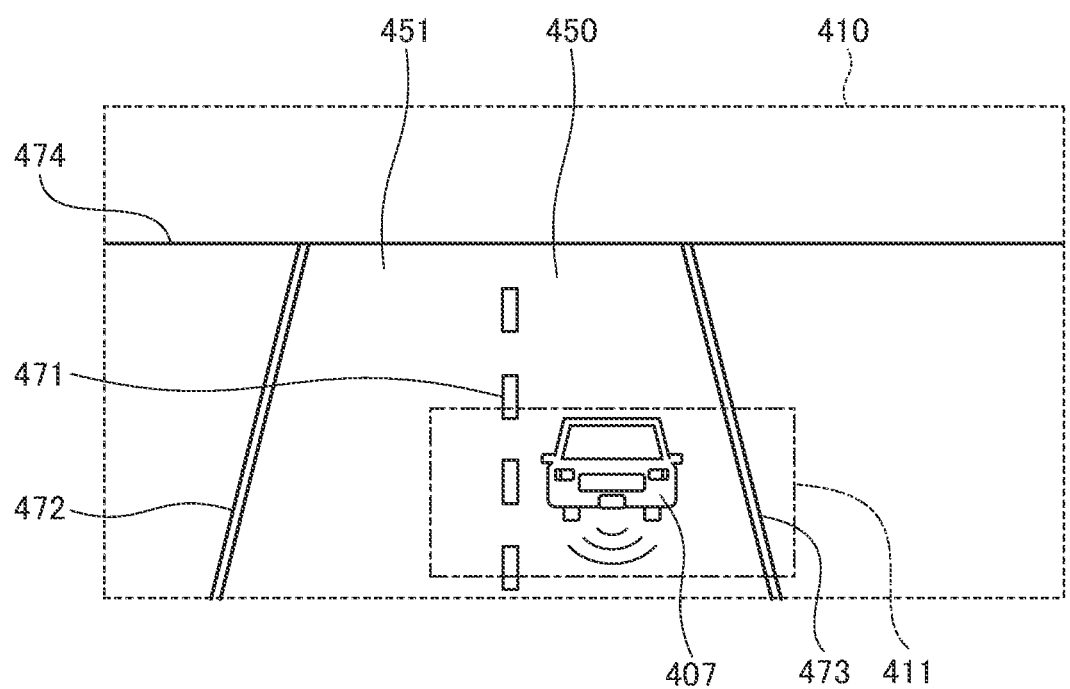
FIG. 19 is a diagram illustrating an example in which a vehicle detecting a klaxon sounding vehicle is imaged by the imaging device.

FIG. 19 is a diagram illustrating an example in which a vehicle detecting the klaxon sounding vehicle 407 is imaged by the imaging device 100. When the klaxon sounding vehicle 407 producing a klaxon sound a plurality of times within the given time is detected in step S1605, a process of step S1606 is performed. Conversely, when a vehicle producing the klaxon sound the plurality of times within the given time is not detected, a process of step S1610 is performed.

In step S1606, the control unit 370 changes a display range on the first display unit 206 or the second display unit 207 so that at least a dangerous vehicle is displayed. That is, as illustrated in FIG. 17, 18, or 19, the display imaging region 411 of FIG. 12 is changed for display so that the own lane 450 and the dangerous vehicle (the passing vehicle 405, the meandering driving vehicle 406, or the klaxon sounding vehicle 407) are changed and displayed to be within the range of the display imaging region 411.

Figure 20:
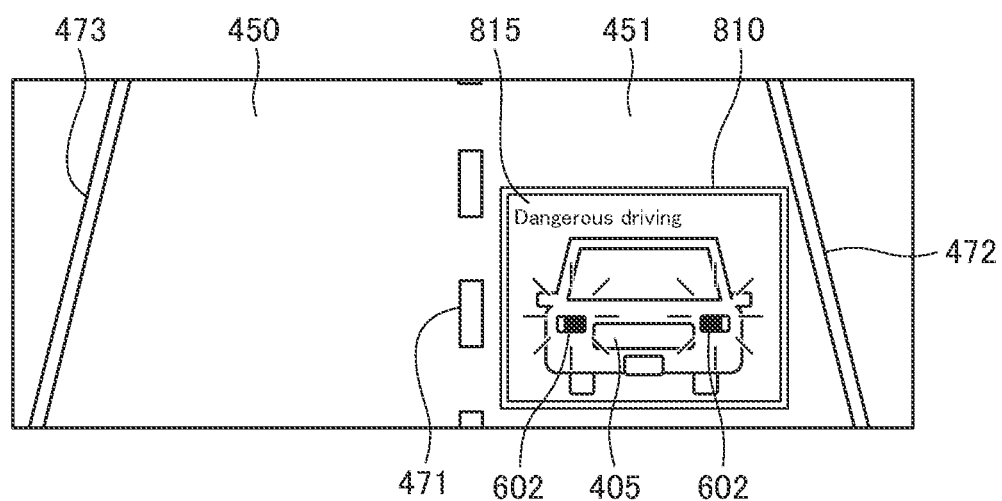
FIG. 20 is a diagram illustrating a display example of a mirror image of a passing vehicle in FIG. 17.

At this time, display content of the first display unit 206 or the second display unit 207 will be described with reference to FIG. 20 by using the passing vehicle 405 as an example. FIG. 20 is a diagram illustrating a display example of a mirror image of the passing vehicle 405 in FIG. 17.

As in FIG. 20, the passing vehicle 405 displayed on the first display unit 206 or the second display unit 207 is surrounded by the recognition frame 810. A tag 815, such as "dangerous driving" indicating a passing vehicle inside the recognition frame 810, regarding an attribute of the passing vehicle 405 which is a predetermined target is displayed for attention.

In addition to such attention, the driver 103 may pay attention by a sound or the like. Similarly, display on the first display unit 206 or the second display unit 207 is performed on the meandering driving vehicle 406 and the klaxon sounding vehicle 407.

Then, a process of step S1608 is performed.

In step S1608, the control unit 370 determines whether a given time has passed after the dangerously driving vehicle (the passing vehicle 405, the meandering driving vehicle 406, or the klaxon sounding vehicle 407) is not detected. In the fourth embodiment, the given time is set to, for example, about 15 seconds. In the case of Yes in step S1608, a process of step S1609 is performed. In the case of No, the process returns to step S1606.

In step S1609, the control unit 370 returns the display on the first display unit 206 or the second display unit 207 to the original display state, that is the immediately previous range of step S1606. The display of the recognition frame 810 and the tag 815 of "dangerous driving" displayed to surround the passing vehicle 405, the meandering driving vehicle 406, or the klaxon sounding vehicle 407 is erased to perform a process of step S1610.

In step S1610, the control unit 370 determines whether traveling is being performed. In the fourth embodiment, it is determined whether a position of the shift lever 203 is set in the drive DR. When the traveling is being performed, the process returns to step S1602 to repeat the operations of steps S1602 to S1610. When the lever detection unit 307 detects in step S1610 that the shift lever 203 is set at a position other than the drive DR, it is determined that the traveling is not being performed, a process of step S1611 is performed, and the flow ends.

As described above, in the fourth embodiment, when it is detected that another mobile object performs a predetermined movement including operations (a dangerously driving operation such as a passing operation, a meandering driving operation, a klaxon sounding operation), the mobile object is detected as a predetermined target and a display range is switched so that the other mobile object is displayed.

Fifth Embodiment

Next, an operation of detecting a vehicle traveling at an illegal speed, a vehicle traveling at an abrupt acceleration speed, or a vehicle traveling in a place where traffic is prohibited in dangerous driving according to a fifth embodiment will be described with reference to FIGS. 21 to 23.

Figure 21:
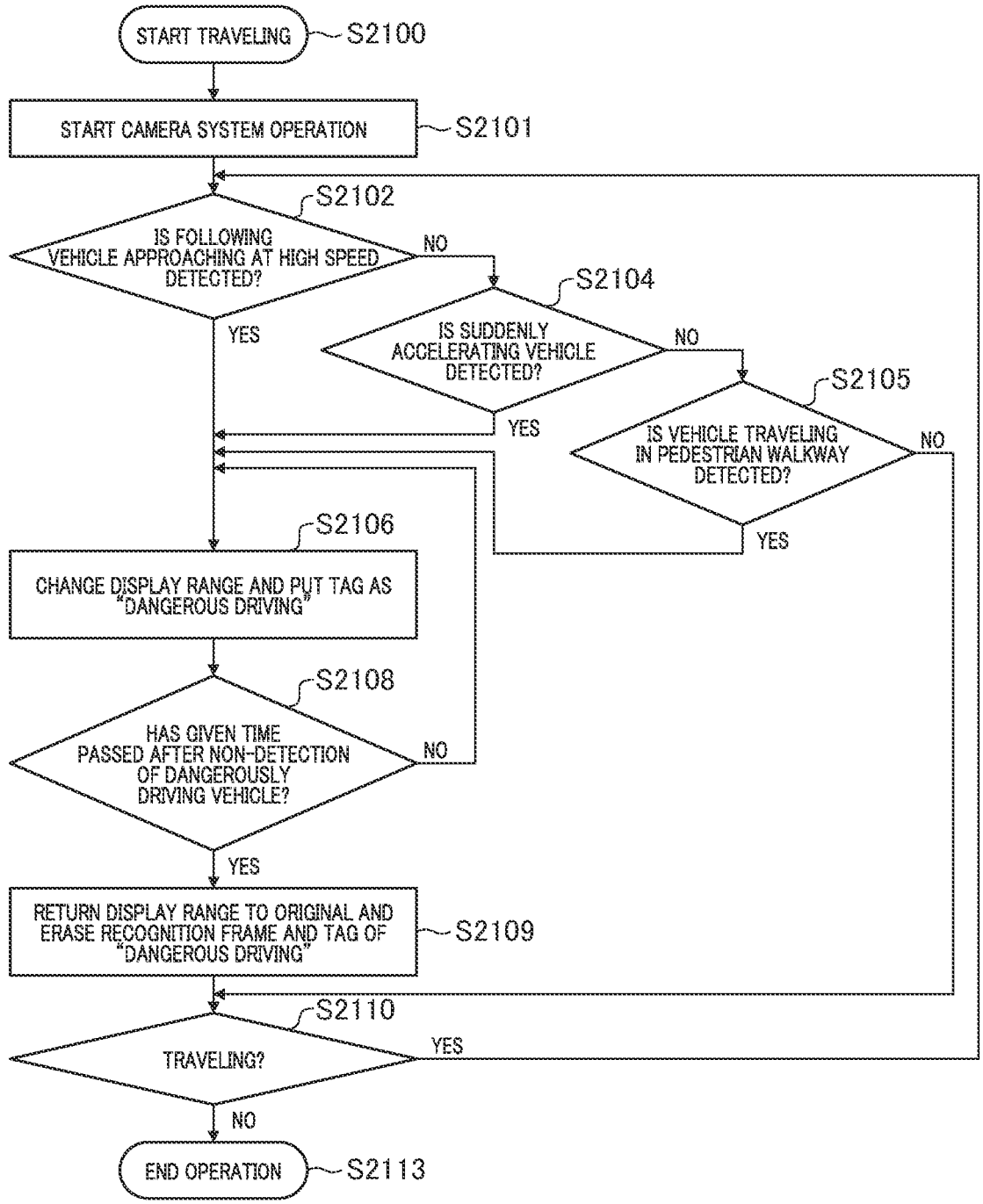
FIG. 21 is a flowchart illustrating an example of a process when a vehicle traveling at an illegal speed, a vehicle traveling at an abrupt acceleration speed, or a vehicle traveling in a place where traffic is prohibited is detected according to a fifth embodiment.

FIG. 21 is a flowchart illustrating an example of a process when a vehicle traveling at an illegal speed, a vehicle traveling at an abrupt acceleration speed, or a vehicle traveling in a place where traffic is prohibited is detected according to a fifth embodiment. An operation of each step in FIG. 21 is performed by causing a CPU serving as an internal computer of the control unit 370 to execute a computer program stored in the memory unit 380.

In the process illustrated in FIG. 21, when the driver 103 sets the position of the shift lever 203 to the drive DR in step S2100 and starts normal traveling of the mobile object 10, a process starts and a process of step S2101 is performed.

In step S2101, a program stored in the memory unit 380 is called by the control unit 370 to start the process. The process starts and the control unit 370 displays an image captured by the imaging device 100 on the first display unit 206 and the process of step S2102 is performed.

Step S2102 is a step in which it is determined whether a following vehicle approaching at a certain high speed or more is detected with the imaging device 100.

In the fifth embodiment, the control unit 370 acquires a legal limit speed of a road on which the captured vehicle is traveling based on map information stored in the memory unit 380, positional information from the positional information detection unit 301 such as GPS installed in the mobile object 10, and the like. Detecting a following vehicle traveling at a speed greater than the limit speed by, for example, a speed 30 km/h or more (hereinafter referred to as a high-speed following vehicle) is performed. That is, a following vehicle operating a traveling operation violating a regulation of a legal speed is detected. When it is determined that a high-speed following vehicle is detected, a process of step S2106 is performed. When the high-speed following vehicle is not detected, a process of step S2104 is performed.

In step S2104, the control unit 370 determines whether a vehicle approaching at a predetermined acceleration speed is detected with the image processing device 360 based on a signal from the imaging device 100. That is, a so-called road rage driving vehicle approaching at a dangerous sudden acceleration is detected. In the fifth embodiment, detecting a vehicle approaching at an acceleration of, for example, 4 m/s$^2$ or more (a suddenly accelerating vehicle) is performed. When it is determined that the suddenly accelerating vehicle is detected, a process of step S2106 is performed. When the suddenly accelerating vehicle is not detected, a process of step S2105 is performed.

In step S2105, the control unit 370 detects a vehicle traveling a given distance or more in a place where traffic is prohibited (for example, a pedestrian walkway). That is, a vehicle traveling a given distance or more in a pedestrian walkway is detected based on image recognition based on a signal from the imaging device 100, map information stored in the memory unit 380, and a present positional information of the mobile object 10 from the positional information detection unit 301. That is, based on the present positional information of the mobile object 10, a following vehicle performing a traveling operation violating a predetermined legal regulation (a regulation of vehicle traffic demarcation or the like) is detected as a predetermined target.

Figure 22:
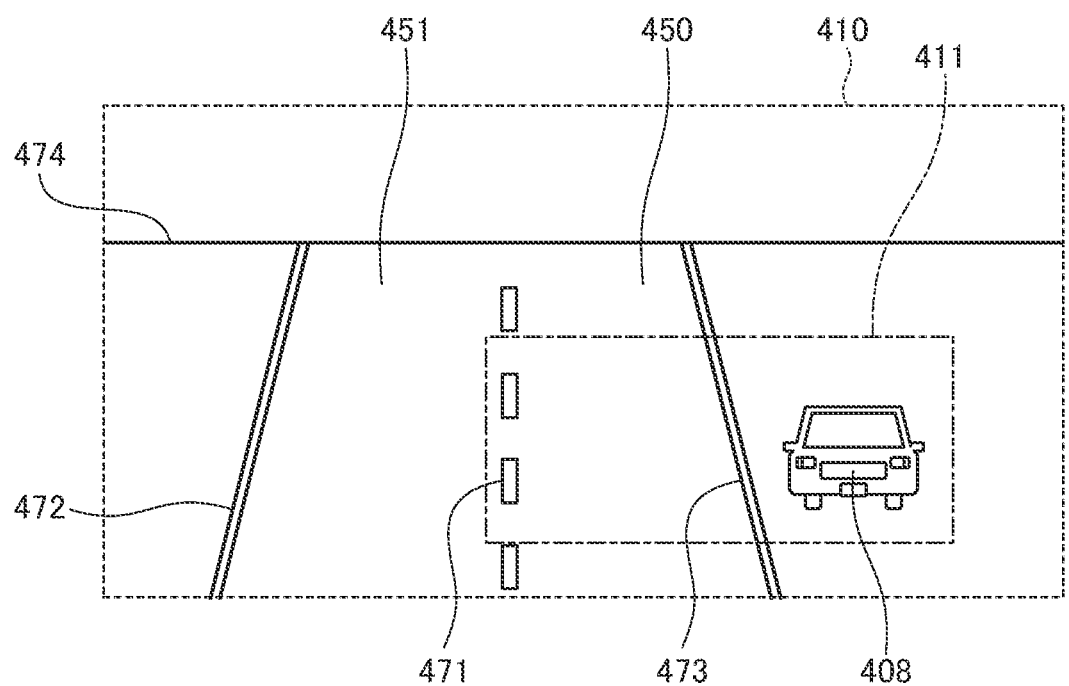
FIG. 22 is a diagram illustrating an example when an imaging device images a vehicle traveling in a pedestrian walkway according to the fifth embodiment.
Figure 23:
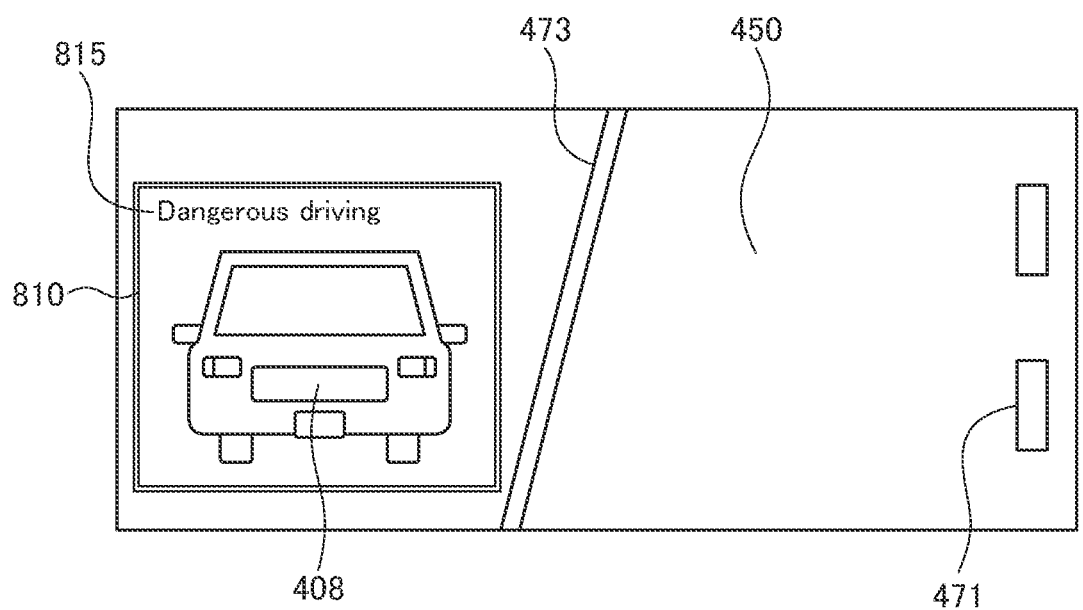
FIG. 23 is a diagram illustrating an example in which an image captured in FIG. 22 is displayed as a mirror image on the first display unit or the second display unit.

FIG. 22 is a diagram illustrating an example when the imaging device 100 images a vehicle traveling in a pedestrian walkway according to the fifth embodiment. FIG. 22 illustrates a state in which a pedestrian walkway driving vehicle 408 traveling in a pedestrian walkway where traveling is prohibited is detected and imaged. In this case, since a road (for example, a one-way road) in which a movement direction is designated by law can also be detected, detecting a so-called reversely traveling vehicle traveling in a direction opposite to a movement direction designated by law may be performed in this step.

In step S2105, it is detected whether the pedestrian walkway driving vehicle 408 or the like is traveling, for example, 100 m or more in a place where traveling is prohibited (for example, a pedestrian walkway). In the case of Yes in step S2105, the process of step S2106 is performed. In the case of No, a process of step S2110 is performed.

In step S2106, the control unit 370 expands a display range on the first display unit 206 or the second display unit 207, for example, from the display imaging region 411 of FIG. 12 to the display imaging region 411 illustrated in FIG. 22. Thus, the display range is changed and displayed so that the own lane 450 and a high-speed following vehicle, a suddenly accelerating vehicle, a pedestrian walkway driving vehicle, or the like are changed and displayed to be within the range of the display imaging region 411.

Display content of the first display unit 206 or the second display unit 207 at that time will be described with reference to FIG. 23. FIG. 23 is a diagram illustrating an example in which an image captured in FIG. 22 is displayed as a mirror image on the first display unit 206 or the second display unit 207. As illustrated in FIG. 23, the pedestrian walkway driving vehicle 408 displayed on the first display unit 206 or the second display unit 207 is surrounded by the recognition frame 810, and the tag 815 such as "dangerous driving" indicating a dangerous vehicle is incidentally displayed inside the recognition frame 810. Thus, the driver 103 can pay attention.

In addition to such attention, the driver 103 may pay attention by a sound or the like. For a high-speed following vehicle or a suddenly accelerating vehicle, similar display is performed on the first display unit 206 or the second display unit 207 and a process of step S2108 is performed.

In step S2108, the control unit 370 determines whether a given time has passed after a dangerous driver is not detected. In the case of Yes in step S2108, a process of step S2109 is performed. In the case of No, the process returns to step S2106.

In step S2109, the control unit 370 determines the display range on the first display unit 206 or the second display unit 207 to the original display state, that is the display imaging range immediately before step S2106 and erases the display of the recognition frame 810 and the tag 815 of "dangerous driving," and a process of step S2110 is performed.

In step S2110, the control unit 370 determines whether the mobile object is traveling. In the fifth embodiment, it is determined whether the position of the shift lever 203 is set in the drive DR. When the mobile object is traveling, the process determines to step S2102 to repeat the operation of steps S2102 to S2110.

When the lever detection unit 307 detects in step S2110 that the shift lever 203 is set at a position other than the drive DR, it is determined that the mobile object is not traveling, a process of step S2113 is performed, and the flow ends.

As described above, in the fifth embodiment, when it is detected that another mobile object performs a predetermined dangerous operation (an illegal speed driving operation, a suddenly accelerating operation, or an operation of traveling in a pedestrian walkway), this mobile object is detected as a predetermined target and a display range is switched so that the other mobile object is displayed.

Sixth Embodiment

In the first to fifth embodiments, when at least one of the predetermined movement including operations (a passing operation, a merging operation, a traveling operation of display a warning light, a dangerously driving operation, and the like) is detected based on a video acquired by the imaging device 100, the switching to a predetermined display range has been performed. The dangerously driving operation includes at least one of meandering driving, a predetermined passing operation, a predetermined klaxon sounding operation, a traveling operation at a predetermined speed or more, a traveling operation at a predetermined acceleration or more, traveling violating a predetermined regulation.

In a sixth embodiment, however, detecting a predetermined type of vehicle set in advance by the driver 103 is performed for display in the image detection imaging region 410 of the imaging device 100. The driver 103 sets a type (model) of vehicle to which it is necessary to pay attention, such as a motorcycle, a large truck, or a crane truck in advance using a setting unit (not illustrated). When the set type of vehicle is detected inside the image detection imaging region 410, the type of vehicle is detected as a predetermined target. Then, the display imaging region 411 of the first display unit 206 or the second display unit 207 is expanded, the recognition frame 810 is displayed, or a tag of "attention vehicle" is displayed. Accordingly, the driver 103 pays attention.

The predetermined vehicle may also include an emergency vehicle (for example, a fire truck, an ambulance, a police car) which does not turn on and off a warning light, a tank lorry, a special vehicle such as a trailer, and a vehicle with a designated number plate.

In the foregoing examples, a process may be performed simultaneously on a plurality of vehicles. In this case, the plurality of recognition frames 810 or a plurality of tags for a plurality of target vehicles may be displayed on the first display unit 206 or the second display unit 207.

In the first to sixth embodiments, the detection of various vehicles has been described, but these examples may be appropriately combined. In this case, any detection which is set to be effective or ineffective in advance may be selectable.

In the above-described examples, the mobile object 10 is not limited to, for example, an automobile. Any vehicle may be used and included as the mobile object as long as the vehicle is a moving device such as a motorcycle, a bicycle, a wheelchair, a ship, an airplane, a robot, or a drone.

The above-described examples can be applied to a screen of an image processing device serving as a remote controller that controls a mobile object remotely.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

This application claims the benefit of Japanese Patent Application No. 2021-177136 filed on Oct. 29, 2021, which is hereby incorporated by reference herein in its entirety.

What is claimed is:
1. An image processing device comprising:
a unit, comprising a processor, that executes a program so as to act as a plurality of units comprising:
(1) an acquisition unit configured to acquire a video from an imaging device that generates rear images of a mobile object;
(2) a display control unit configured to cause a first display unit to display a first range in the video acquired by the acquisition unit; and
(3) a detection unit configured to detect a predetermined target based on the video acquired by the acquisition unit,
wherein, when the detection unit detects the predetermined target, the display control unit switches to a second display unit different from the first display unit to display the video in a second range different from the first range.

2. The image processing device according to claim 1, wherein the second range is a range in which at least the predetermined target is included.

3. The image processing device according to claim 2, wherein the second range is a range in which the mobile object is also included.

4. The image processing device according to claim 1, wherein the detection unit detects another mobile object performing a predetermined movement as the predetermined target based on the video acquired by the acquisition unit.

5. The image processing device according to claim 4, wherein the predetermined movement includes at least one of a passing operation, a merging operation, a traveling operation of displaying a warning light, and a dangerous driving operation.

6. The image processing device according to claim 5, wherein the dangerous driving operation includes at least one of meandering driving, a predetermined passing operation, a predetermined klaxon operation, a traveling operation at a predetermined speed or more, a traveling operation at a predetermined acceleration or more, and a traveling operation violating a predetermined legal regulation.

7. The image processing device according to claim 4, wherein the plurality of units further comprises a positional information detection unit configured to acquire information regarding a present position of the mobile object, and
wherein the detection unit detects the another mobile object as the predetermined target based on the information regarding the present position.

8. The image processing device according to claim 4, wherein the plurality of units further comprises a sound detection unit configured to detect a sound, and
wherein, based on a predetermined sound detected by the sound detection unit and the video acquired by the acquisition unit, the another mobile object producing a predetermined sound is detected as the predetermined target.

9. The image processing device according to claim 1, wherein the detection unit detects a predetermined type of another mobile object as the predetermined target based on the video acquired by the acquisition unit.

10. The image processing device according to claim 1, wherein the display control unit causes the first display unit to display an attribute of the predetermined target.

11. The image processing device according to claim 1, wherein the display control unit causes the first display unit to display a recognition frame surrounding the predetermined target.

12. A mobile object in which an imaging device that generates rear images of the mobile object is disposed, the mobile object comprising:
a unit, comprising a processor, that executes a program so as to act as a plurality of units comprising:
(1) an acquisition unit configured to acquire a video from the imaging device;
(2) a display control unit configured to cause the first display unit to display a first range in the video acquired by the acquisition unit; and
(3) a detection unit configured to detect a predetermined target based on the video acquired by the acquisition unit,
wherein, when the detection unit detects the predetermined target, the display control unit switches to a second display unit different from the first display unit to display the video in a second range different from the first range.

13. An apparatus-implemented image processing method comprising:
acquiring a video from an imaging device that generates rear images of a mobile object;
displaying a first range in the video acquired in the acquiring on a first display unit; and
detecting a predetermined target based on the video acquired in the acquiring,
wherein, when the predetermined target is detected in the detecting, switching to cause a second display unit different from the first display unit to display the video in a second range different from the first range.

14. A non-transitory computer-readable storage medium configured to store a computer program comprising instructions for executing a method comprising:
acquiring a video from an imaging device that generates rear images of a mobile object;
displaying a first range in the video acquired in the acquiring on a first display unit; and
detecting a predetermined target based on the video acquired in the acquiring,
wherein, when the predetermined target is detected in the detecting, switching to cause a second display unit different from the first display unit to display the video in a second range different from the first range.

15. An image processing device comprising:
a unit, comprising a processor, that executes a program so as to act as a plurality of units comprising:
(1) an acquisition unit configured to acquire a video from an imaging device that generates rear images of a mobile object;
(2) a display control unit configured to cause a first display unit to display a first range in the video acquired by the acquisition unit; and
(3) a detection unit configured to detect another moving object based on the video acquired by the acquisition unit,
wherein, when the detection unit detects the another moving object, the display control unit switches to cause a second display unit different from the first display unit to display the video in a second range different from the first range.

* * * * *